Aug. 6, 1968    R. L. EVANS ET AL    3,395,610
ELECTROSTATIC COPYING MACHINE FOR BOOKS AND THE LIKE
Filed May 11, 1965    13 Sheets-Sheet 1
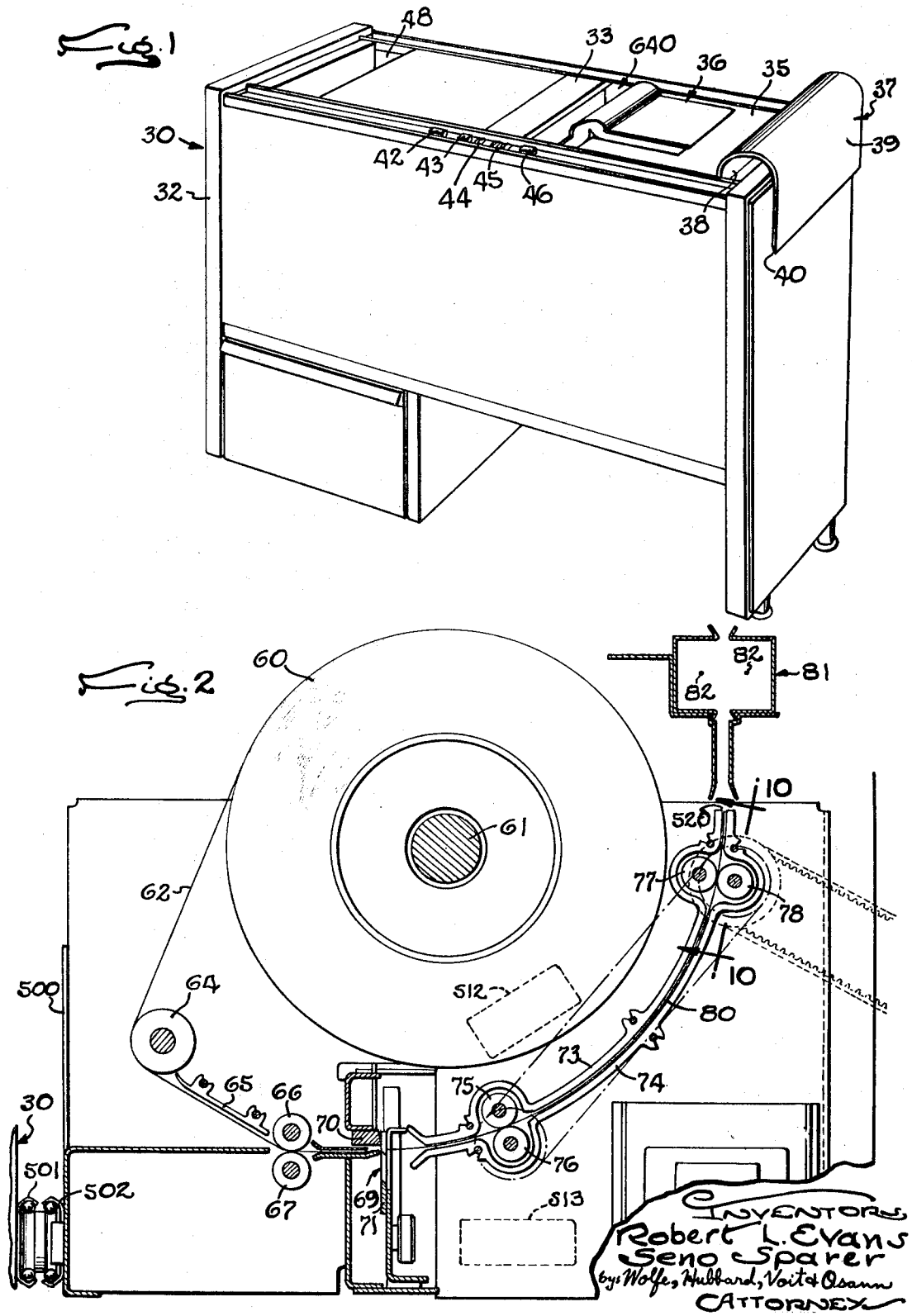
INVENTORS
Robert L. Evans
Seno Sparer
by: Wolfe, Hubbard, Voit & Osann
ATTORNEY

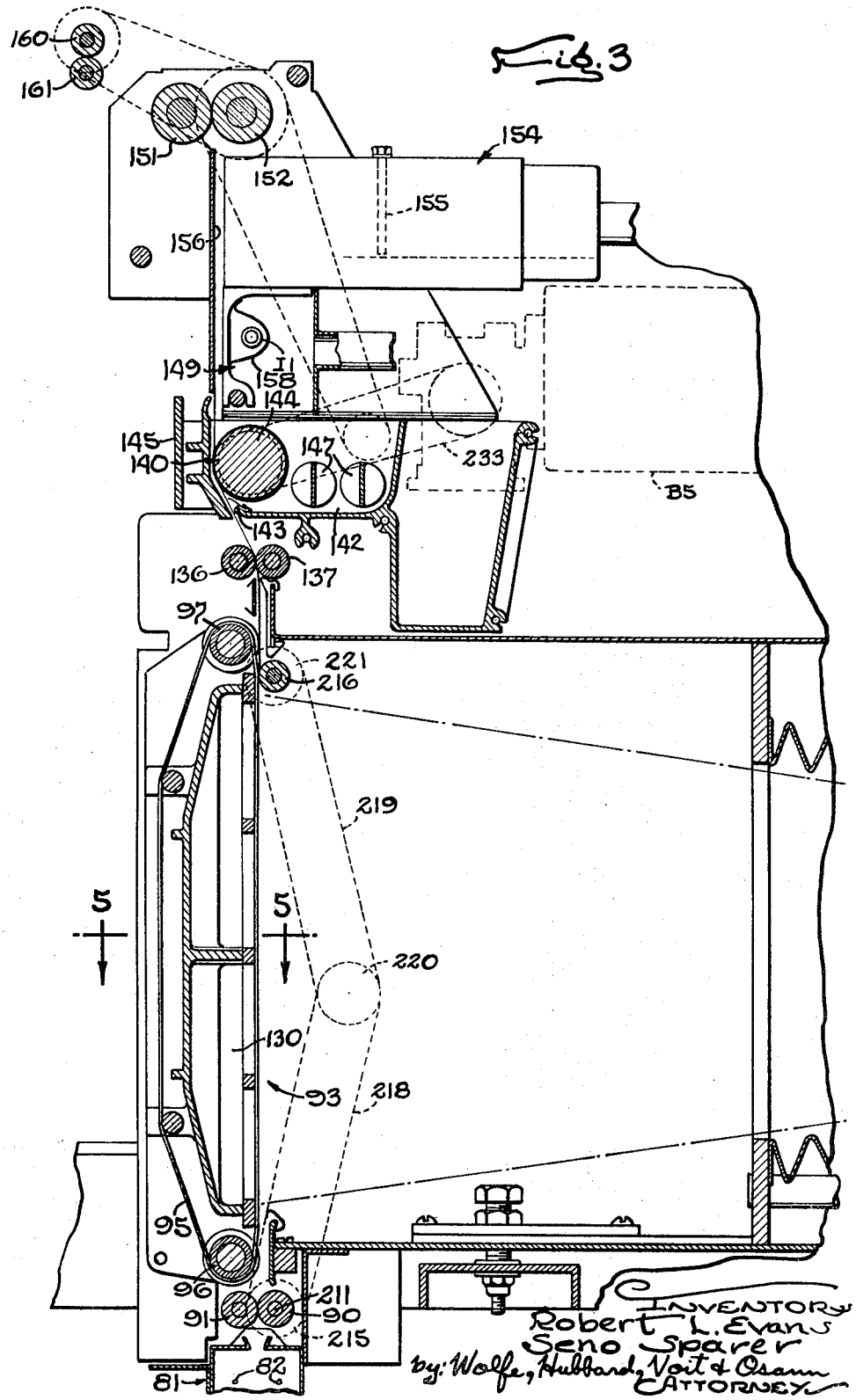

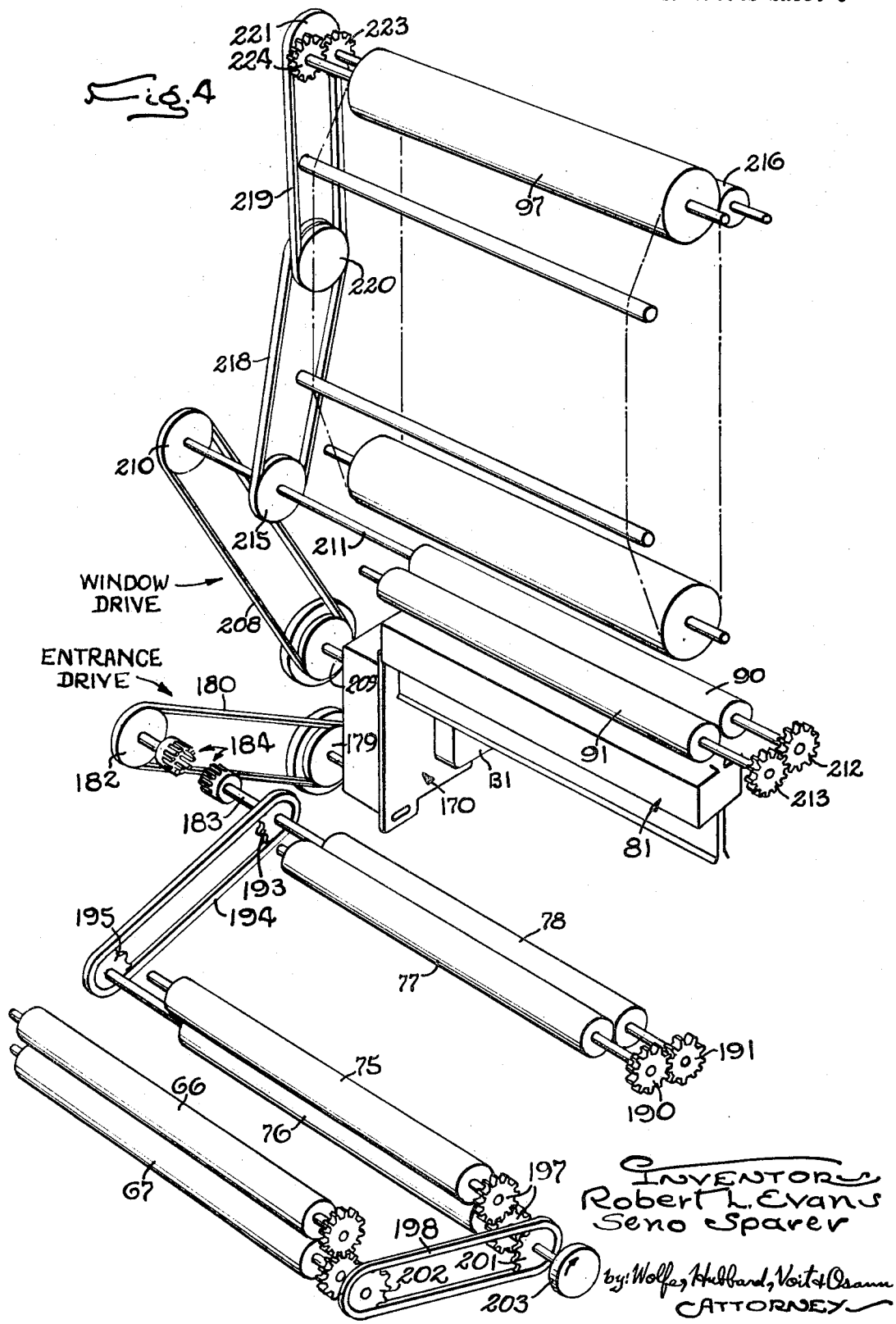

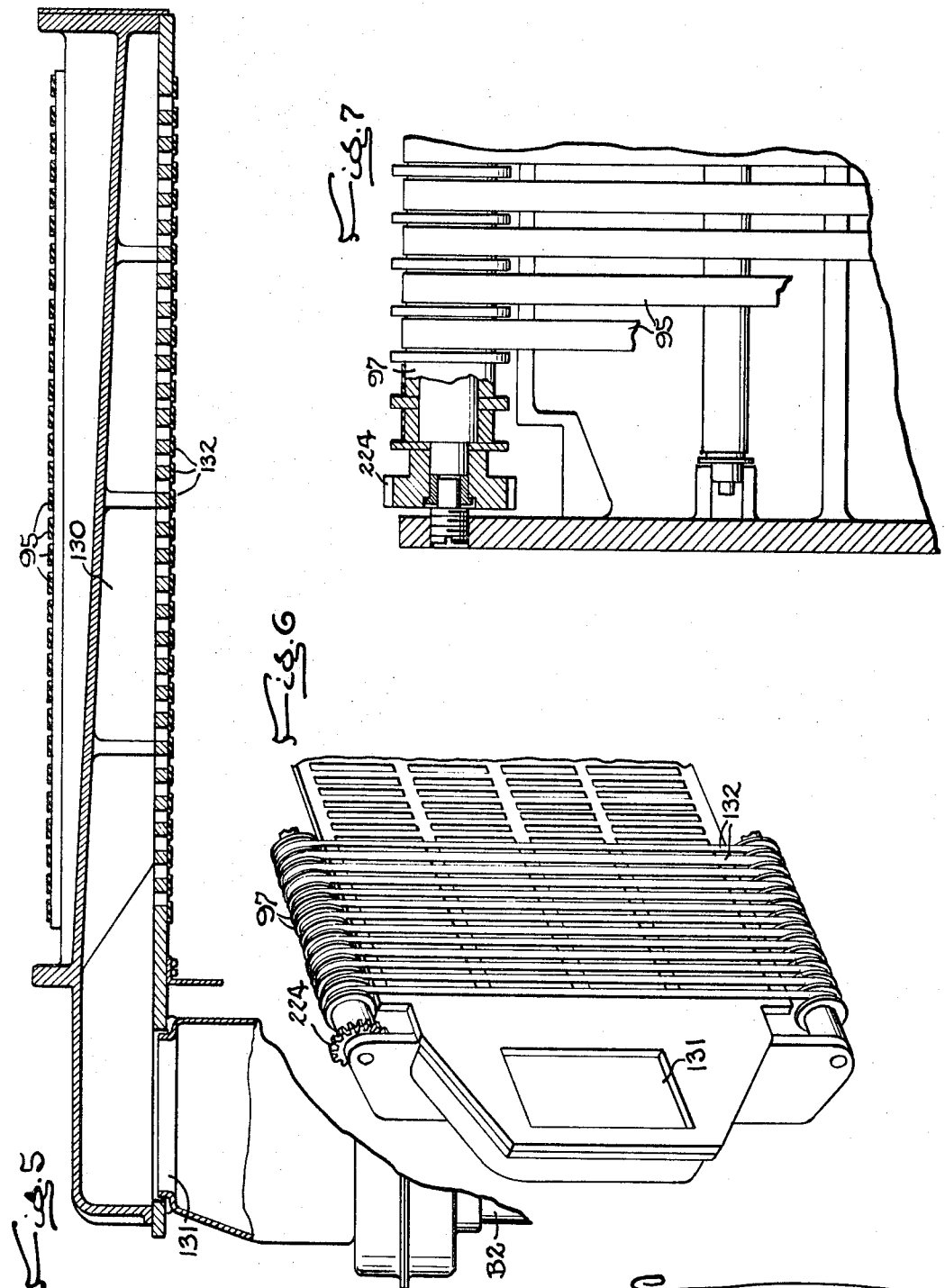

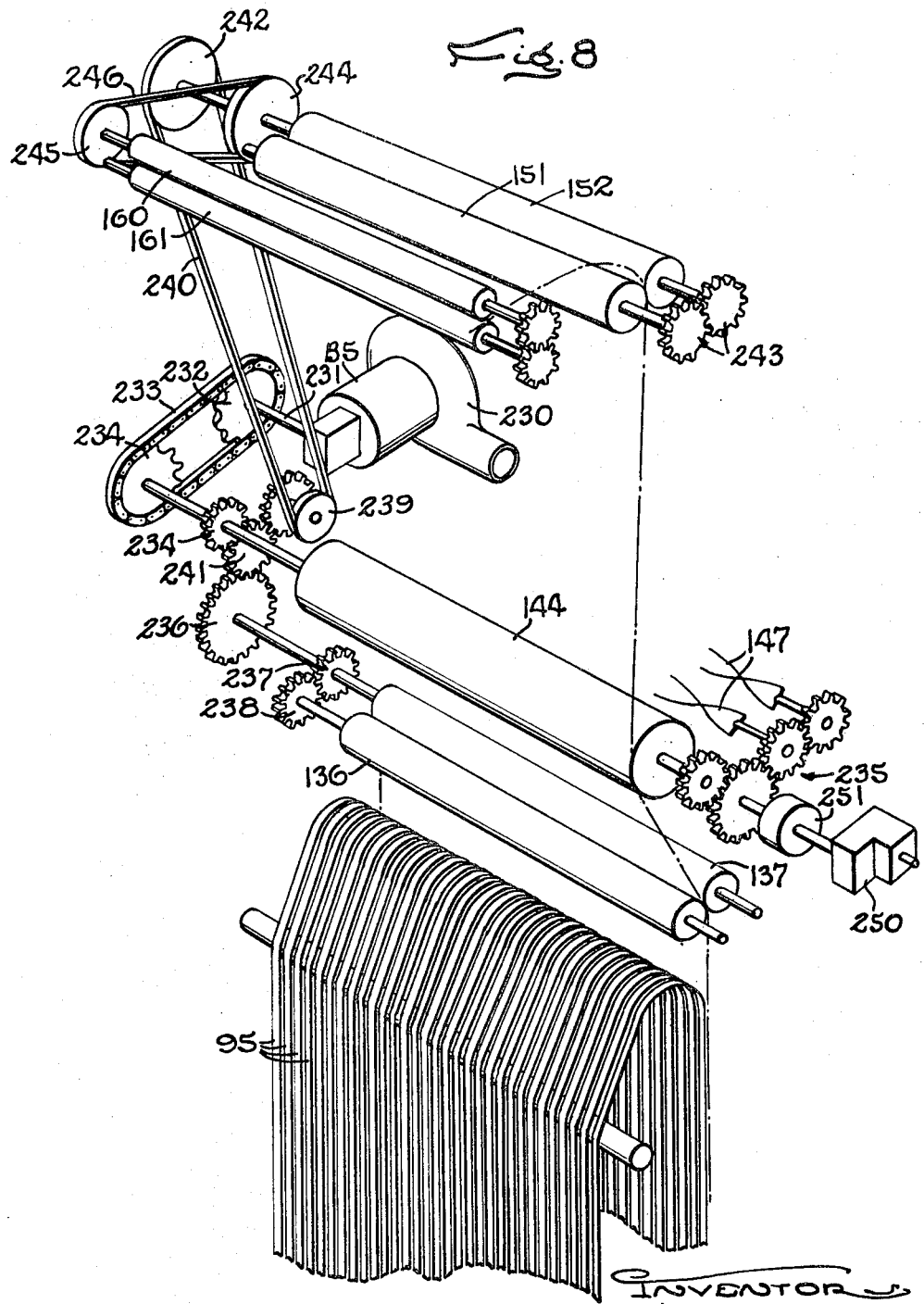

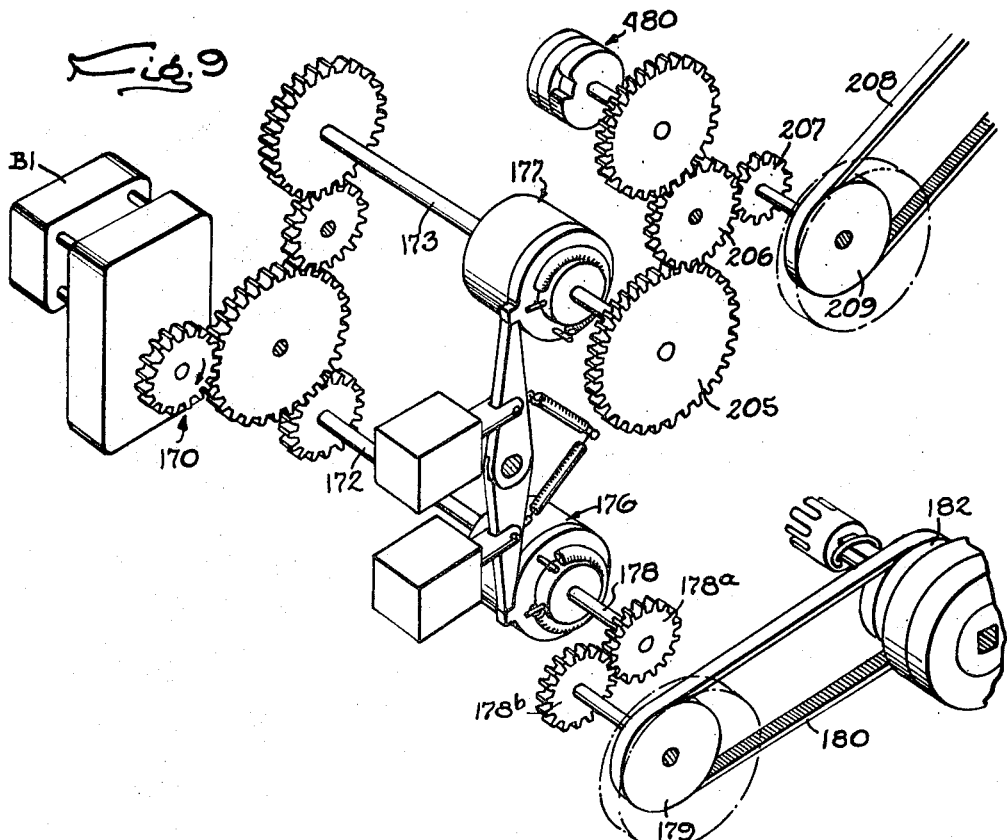
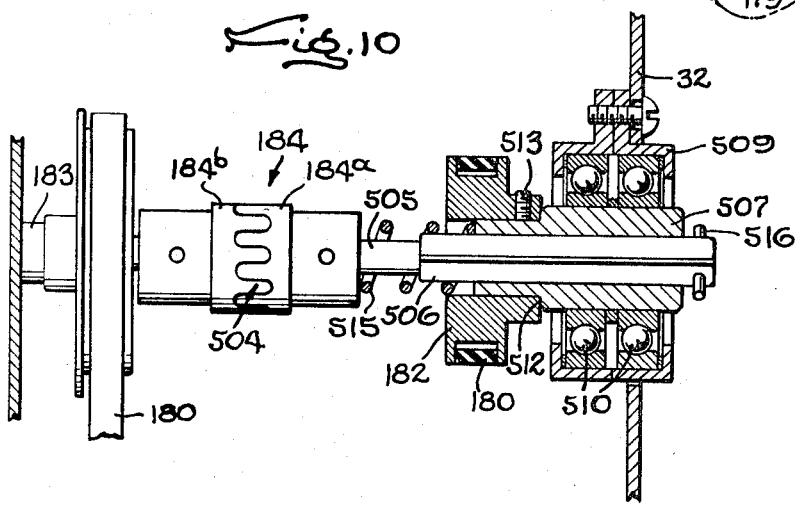

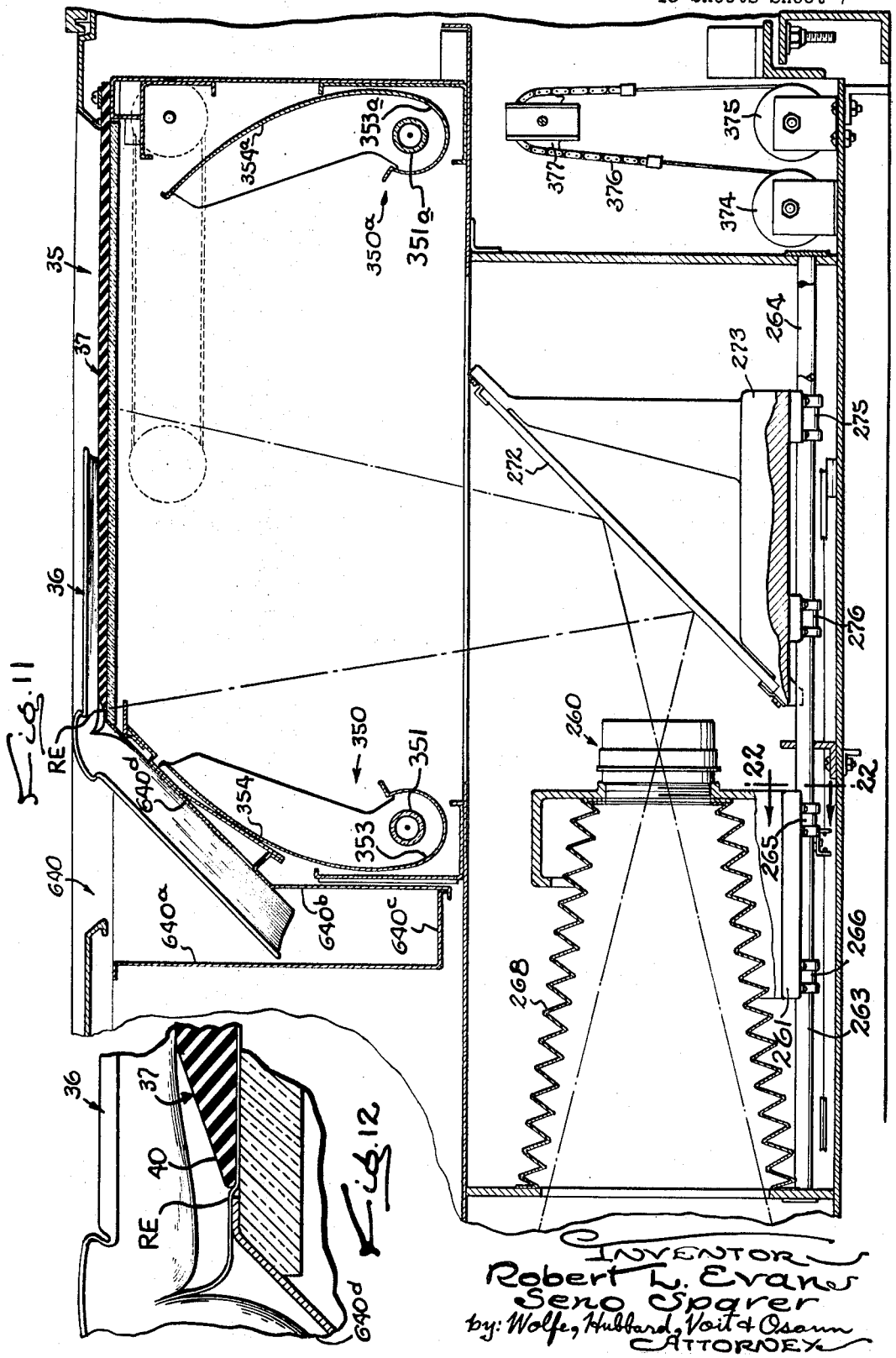

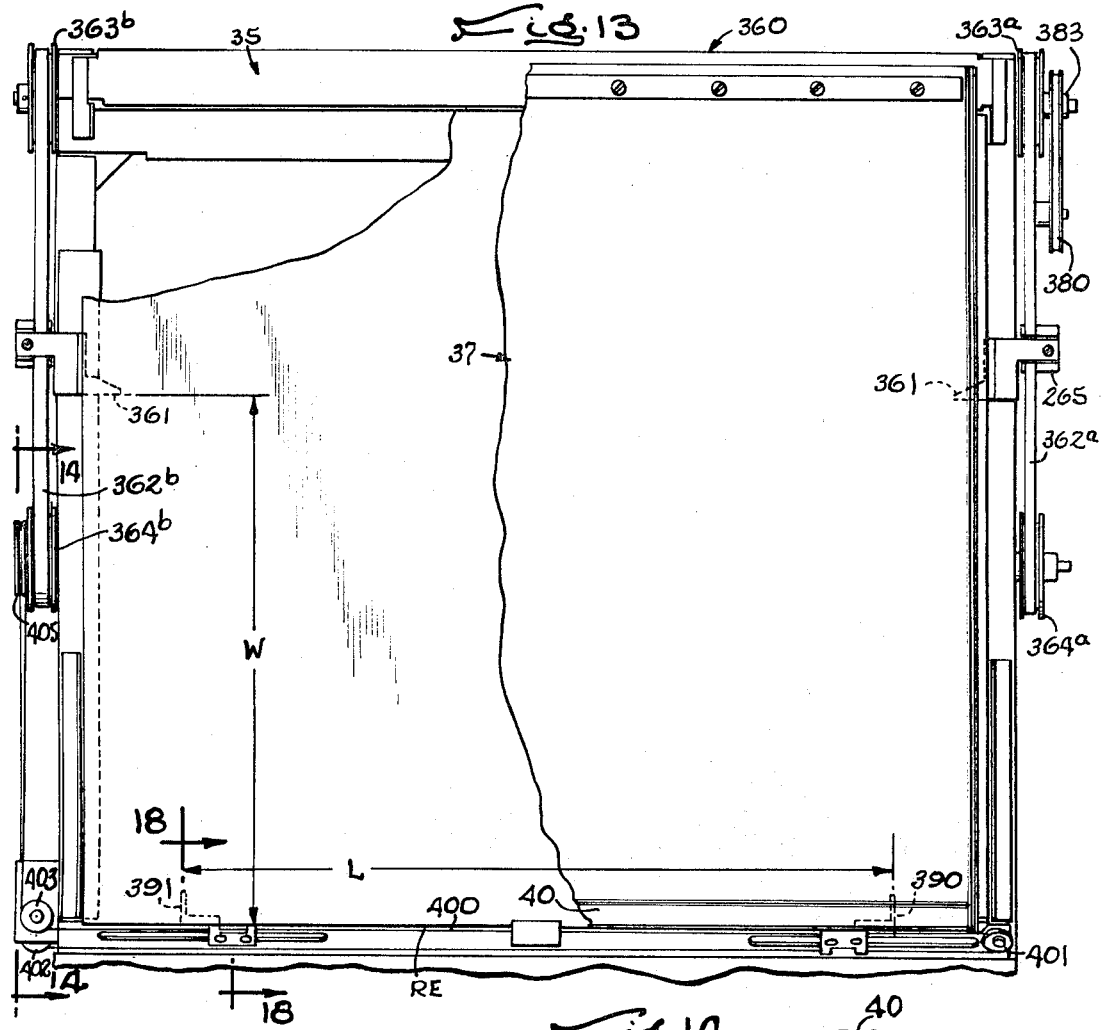
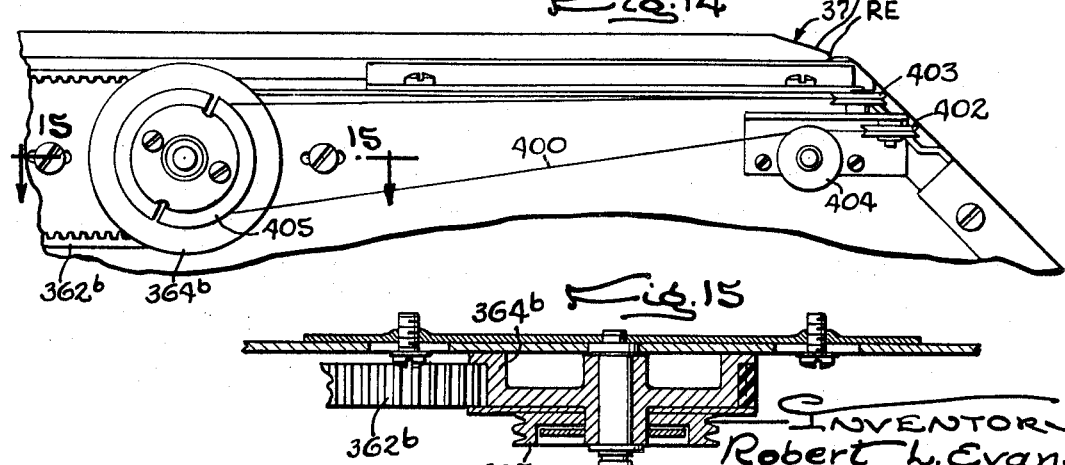
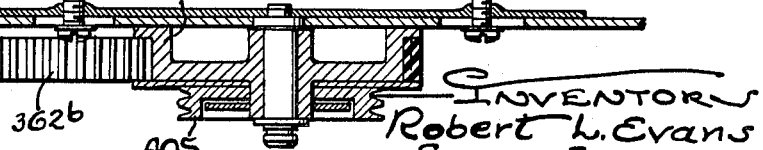

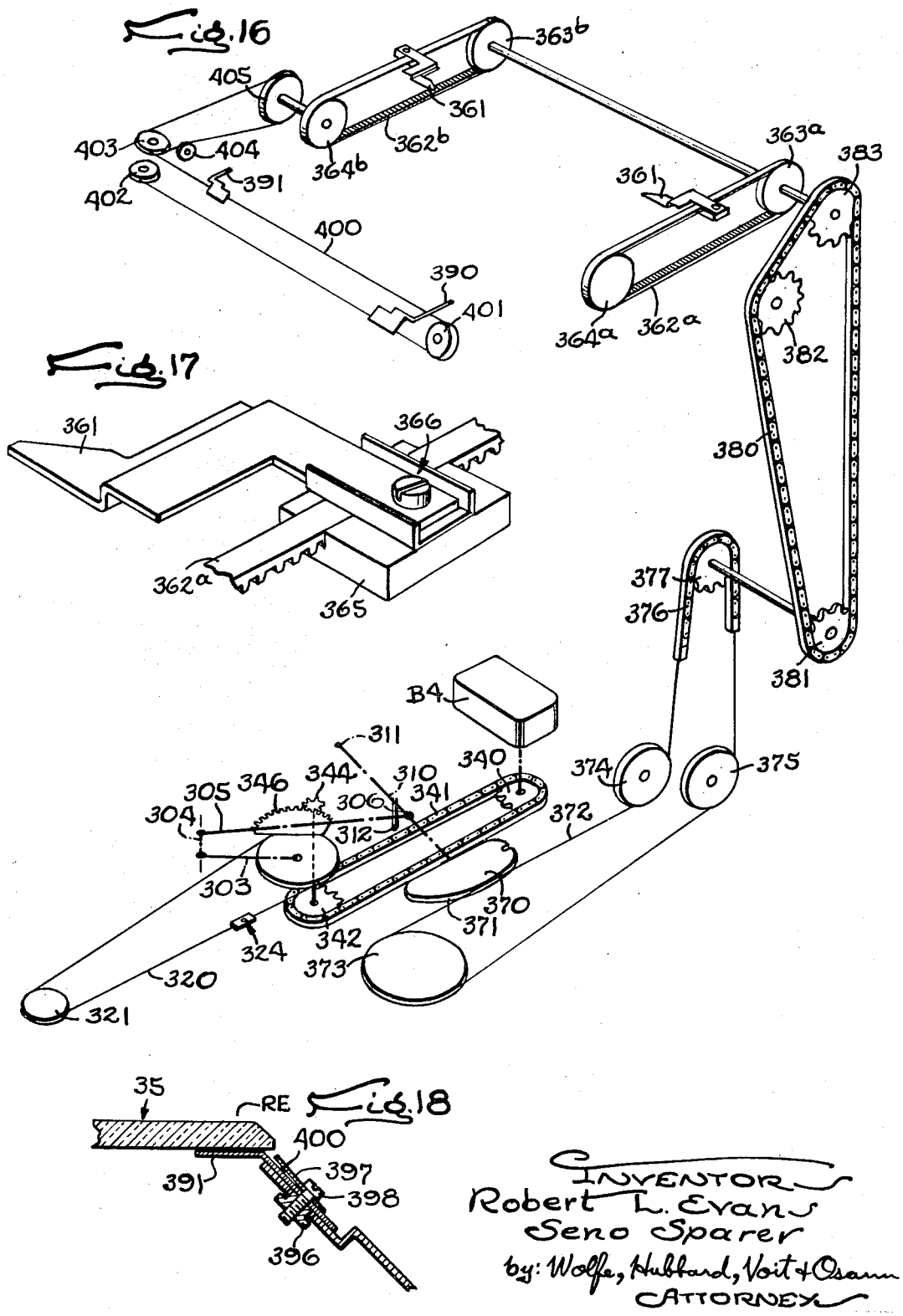

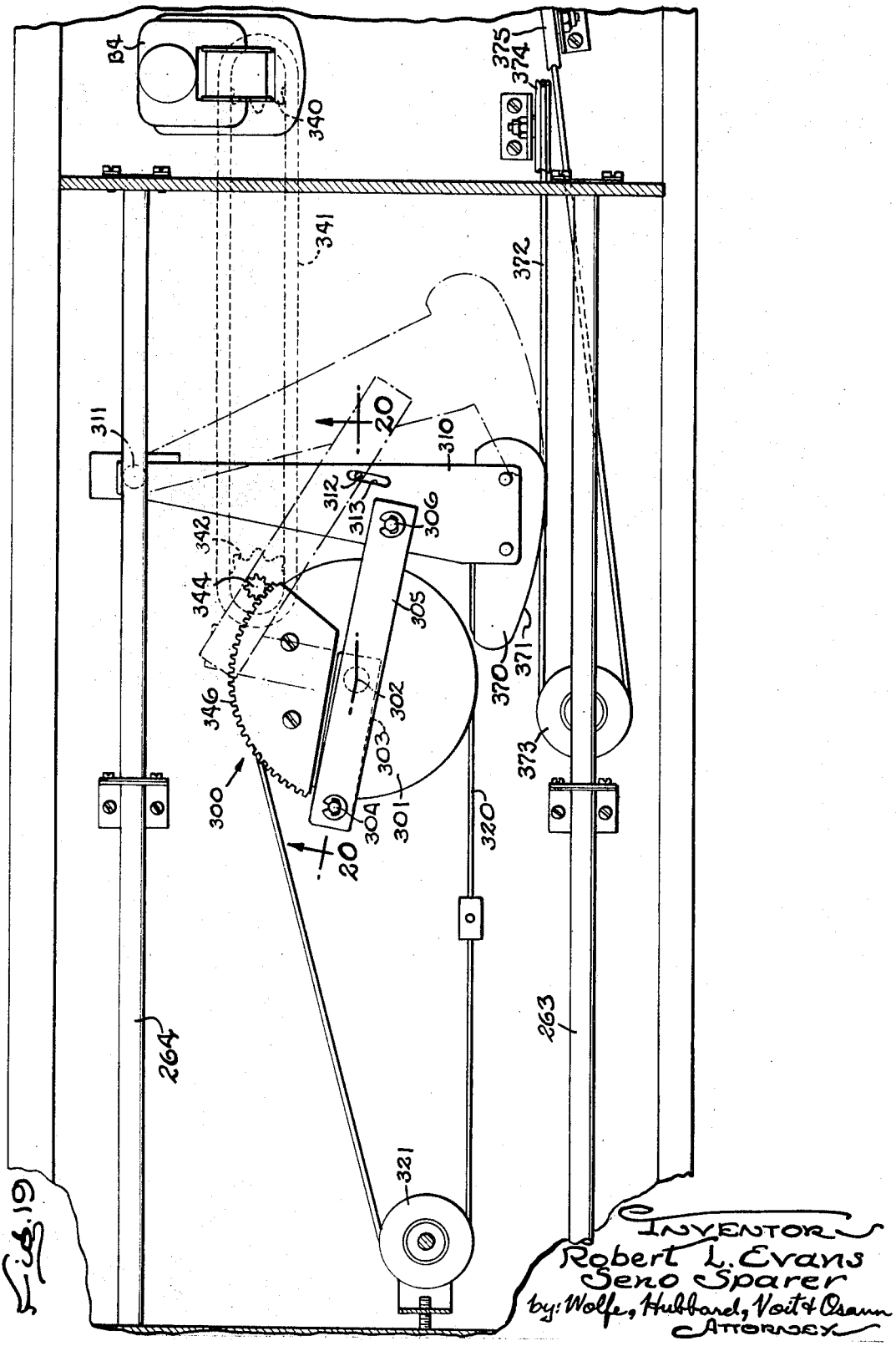

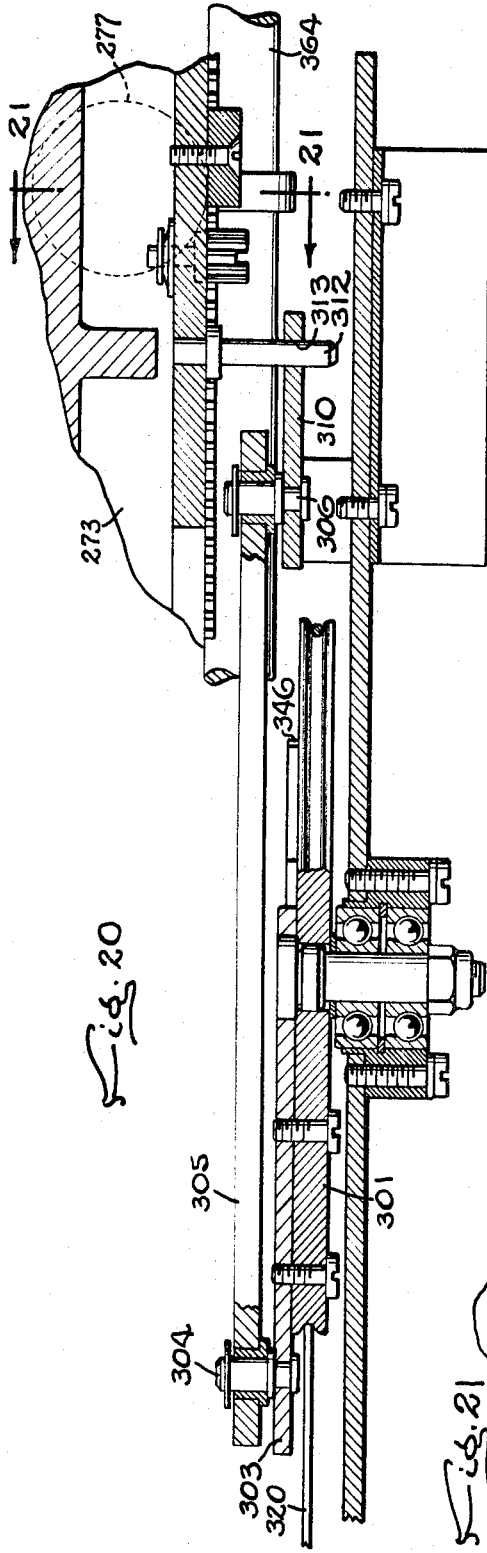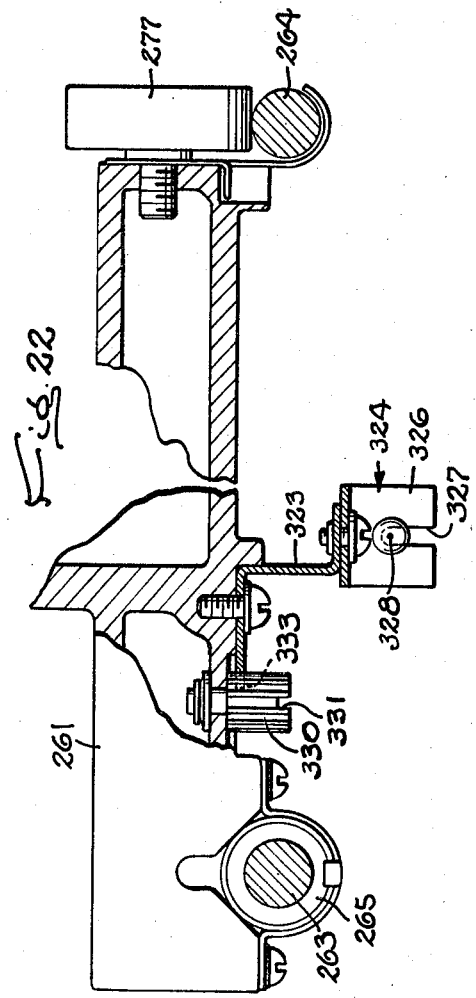

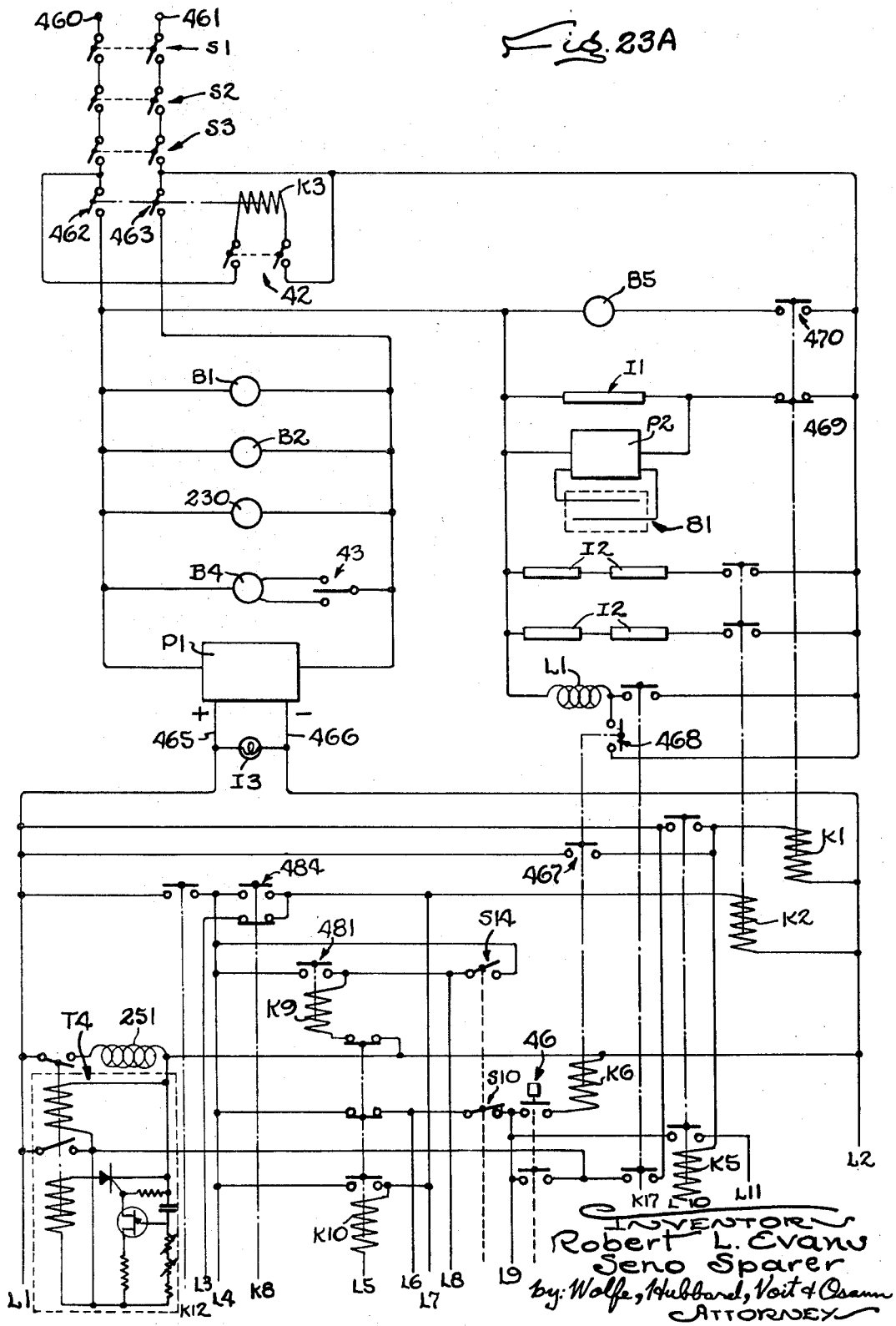

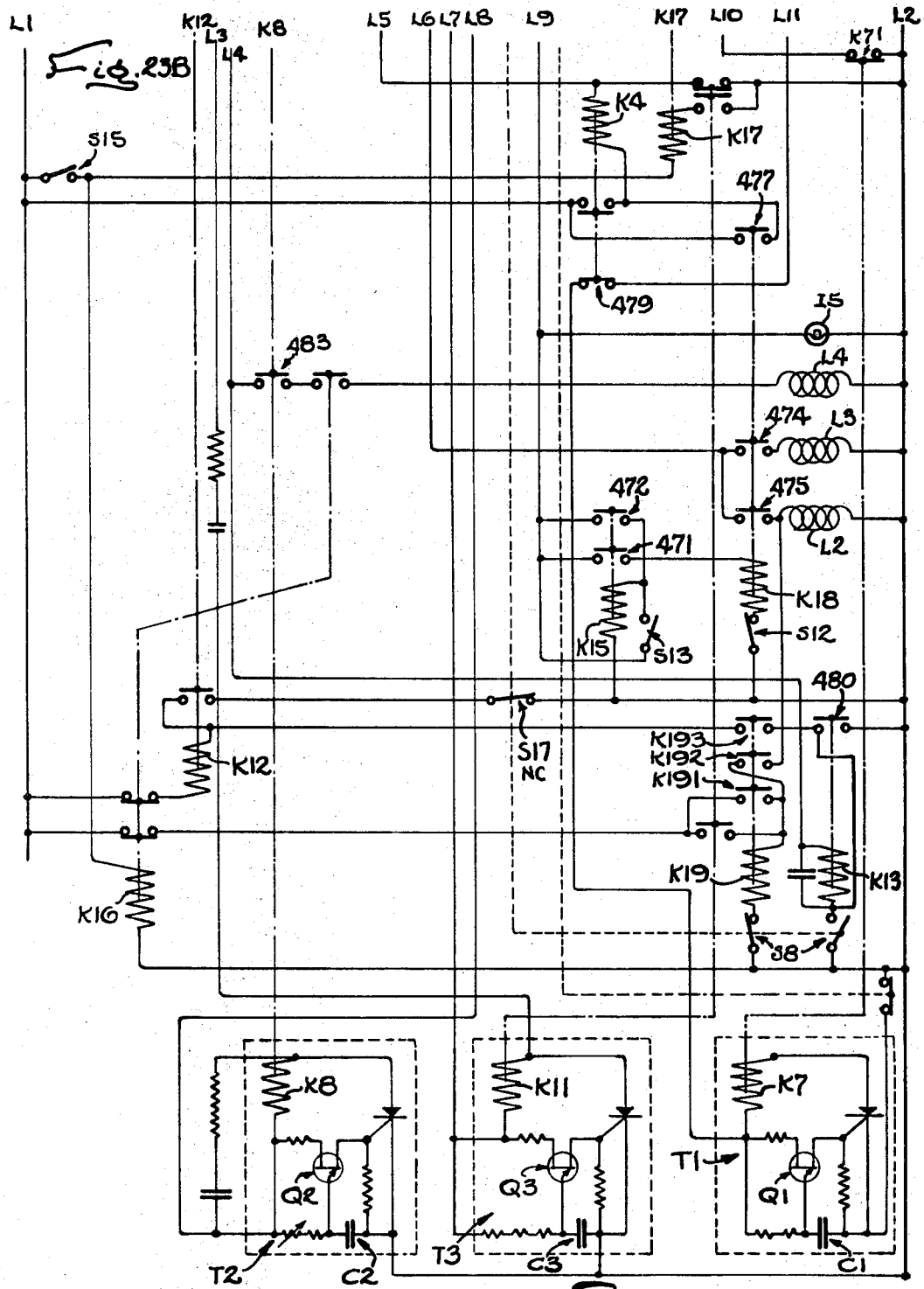

United States Patent Office 3,395,610
Patented Aug. 6, 1968

3,395,610
ELECTROSTATIC COPYING MACHINE
FOR BOOKS AND THE LIKE
Robert L. Evans and Seno Sparer, Evanston, Ill., assignors to American Photocopy Equipment Company, Evanston, Ill., a corporation of Illinois
Filed May 11, 1965, Ser. No. 454,820
21 Claims. (Cl. 88—24)

ABSTRACT OF THE DISCLOSURE

An electrostatic copy machine having a frame, a horizontal window for supporting an original at the top of the frame, a source of illumination under the window and a vertically oriented exposing station offset from the window with means to position a copy sheet therein. A 45° mirror and a lens, both having carriages are interposed between the window and exposure station. A means associated with the window defines a reference edge for placement of the original on the window and an adjustable framing member is provided opposite the reference edge. The framing member is adjustable to frame the original while simultaneously moving the lens and mirror carriages to shift the optical axis to the center of the original and maintain focus of the projected image on the copy sheet.

---

The present invention relates to office photocopy machines and more particularly to a machine capable of copying originals even in the form of books or sheets.

It is an object of the present invention to provide a machine which is capable of handling substantially all of the photocopy work which may arise in a business office.

It is another object of the present invention to provide a photocopy machine which is capable of copying originals of various sizes, with all copies being made in standard letterhead size and with all originals larger than letterhead size being reduced to letterhead size. It is a related object to provide a photocopy machine which is capable of copying originals having a range of size but which is easy to operate, requiring only the setting of a margin guide at the edge of the original to bring about automatic adjustment of magnification and focusing. Thus, it is an object to provide an office photocopy machine which may be successfully used by anyone without prior instruction or experience. It is a related object of the present invention to provide a photocopy machine in which all originals, regardless of size, are positioned at the same reference edge which occupies a fixed position, with automatic shifting of the optical axis to the center of the original regardless of its size.

It is another and related object to provide a machine which is particularly well adapted for the copying of book pages of various size without loss or distortion of copy at the inner margin and without necessity for "flattening" the open book or cracking the binding as is frequently necessary in using conventional photocopy machines. More specifically, it is an object to provide a photocopy machine having a reference edge for the positioning of all the originals to be copied, regardless of size, defining, immediately adjacent thereto, a book "well" or "step" for accommodating the free, overhanging portion of the book permitting accurate copies to be made with the book only partially opened so that there is no risk to the book even when the copying is done by careless or inexperienced personnel.

It is a further object of the invention to provide a photocopy machine having means for automatic focusing and automatic adjustment of magnification, depending upon the size of the original which is highly precise but which, nevertheless, employs conventional low cost optical elements avoiding any necessity for zoom type lenses with their attendant expense and necessity for critical adjustment. It is also an object to provide an automatic exposure control which varies the exposure correctively in accordance with the degree of magnification.

In the present device, all of the optical adjusting movements are large, low cost mechanical linkages which may be employed without fear of degradation of the image by backlash.

In one of the aspects of the invention, it is an object to produce a machine having the above features and advantages and in which the original need not be fed into the machine but occupies a stationary position at the top of the machine during exposure.

It is, moreover, an object of the present invention to provide a photocopy machine in which the copy paper is fed from a large capacity roll which need be replenished only at widely spaced intervals and in which novel means are provided for mounting and transporting the roll so that it may be loaded in the machine easily and quickly and with all manipulated parts fully accessible. In this connection, it is an object to provide a machine having a roll carriage with self-contained provision for driving the web and in which the drive connection is made automatically incident to pushing the carriage into its final operating position. More specifically, it is an object in one of the aspects of the present invention to provide a novel means for mounting a copy paper supply roll so that it may be loaded in the machine at waist level, thereby avoiding the necessity for handling or adjusting the feed mechanism while in an awkward or stooped position as required by many conventional machines.

It is still another object of the invention to provide a photocopy machine having an automatic control system for advancing, cutting, and positioning the copy sheet in which reliance is not placed on limit switches operated by the sheet but in which the operations are, on the contrary, under the control of single revolution clutches for reliable sequencing and a high degree of positioning and cut-off accuracy.

It is yet another object of the invention to provide a photocopy machine having a noval vacuum belt arrangement for transporting the copy sheet and for positioning the copy sheet flatly during exposure, thereby permitting exposure all the way out to the edge of the sheet and insuring a clean white border. It is a related object to provide transport and positioning means for the copy sheet which is substantially jamproof even when the sheet may have a tendency to curl, particularly at the edge thereof, because of atmospheric conditions or because of manufacturing variations of the paper being used.

Other objects and advantages will become apparent upon reading the attached detailed description and upon reference to the drawings in which:

FIGURE 1 is a perspective at reduced scale of a photocopy machine constructed in accordance with the present invention;

FIG. 2 is a fragmentary side view showing the paper feed mechanism and corona unit;

FIG. 3 is a fragmentary view partially in section showing the path of the copy sheet through the machine;

FIG. 4 is a view in perspective depicting the lower driving mechanism of the machine;

FIG. 5 is a view taken along the line 5—5 in FIG. 3, showing the vacuum chamber and the vacuum transporting arrangement;

FIG. 6 is a fragmentary view in perspective showing the vacuum transport belt arrangement;

FIG. 7 is an enlarged fragmentary front view showing the vacuum belt arrangement with portions thereof broken away;

FIG. 8 is a schematic view in perspective of the upper driving mechanism of the machine;

FIG. 9 is a perspective view showing the driving arrangement and single revolution clutches;

FIG. 10 is a view taken along the line 10—10 in FIG. 2 and showing the coupling for disconnecting driving connection on the paper roll carriage;

FIG. 11 is a side view showing the optical projection system of the machine;

FIG. 12 is an enlarged fragmentary view depicting the cover flap inserted between the pages of a book;

FIG. 13 is a top view of the window with portions of the glass and cover broken away, depicting the window framing pointers;

FIG. 14 is a fragmentary view taken along the line 14—14 in FIG. 13;

FIG. 15 is a view taken along the line 15—15 in FIG. 14;

FIG. 16 is a schematic perspective view showing the window framing mechanism;

FIG. 17 is an enlarged view in perspective of a window framing pointer;

FIG. 18 is a fragmentary side view showing the first reference edge in the window;

FIG. 19 is an elevation showing the four-bar linkage used for moving the lenses and mirror coordinately;

FIG. 20 is a view taken along the line 20—20 in FIG. 19;

FIG. 21 is a view taken along the line 21—21 in FIG. 20;

FIG. 22 is a view taken along the line 22—22 in FIG. 11; and

FIGS. 23a and 23b are diagrams of the control circuit for the photocopy machine.

While the invention has been described in connection with the preferred embodiment, it will be understood that there is no intention to limit the invention to the embodiments shown but we intend to cover the various alternative and equivalent constructions falling within the spirit and scope of the appended claims.

Turning now to the drawings, the photocopy machine, as seen in FIG. 1, is in the form of a console 30 having a frame and surrounding housing 32, with a top surface 33. Mounted in the top surface is a horizontal copying window 35 on which a booklet 36, or sheet to be copied, is placed. For the purpose of holding the sheet in place and for preventing entry of unwanted light, a cover 37, in the form of a flexible pad of rubber or the like having one of its edges 38 fixed to the top surface of the console is provided. The cover, being shown in a backwardly swung position, is provided with a reflective undersurface 39. In order to permit insertion between the pages of a book, the cover material is preferably thin and has a beveled edge 40 to enable it to be inserted close to the bound edge of a book page.

Also occupying the top surface along a rail 41 of the housing are the necessary controls to operate the machine including a power-on-push button 42, a magnification control switch 43, an exposure control 44, a selector dial 45 for producing the desired number of copies, and a copy start switch 46. Finally, along the left-hand side of the machine, as viewed in FIG. 1, is a well 48 for receiving the copies.

In operation, the book 36 or sheet to be copied is positioned on the window 35, push button 42 is operated to start the mechanism, and the sheet is framed by moving the switch 43 to the right or left as viewed in FIG. 1. The number of copies to be made is set on the selector dial 45 and, within a few seconds after the copy start switch 46 is operated, the copies are deposited in the well 48.

While various features of the machine to be discussed apply to photocopying generally and are not limited to any particular photocopying process, the device in its preferred form employs electrostatics, utilizing a copy sheet having a coating of dielectric resin loaded with zinc oxide and which is provided with an all-over electrical charge prior to being exposed to the light image of the original. The areas which are struck by light are selectively discharged following which the copy sheet is developed by application of pigmented powder which is fixed in place by radiant heat. The photocopy sheet may, for example, be that disclosed in Sugarman et al. U.S. Patent No. 3,051,569 and the pigmented powder or toner may be formulated in accordance with Sugarman et al. application Ser. No. 119,394 filed June 26, 1961, now abandoned, or Ser. No. 222,196 filed Sept. 7, 1962, now abandoned. A typical prior machine employing the electrostatic process and to which reference may be made for details not disclosed herein is described in Sugarman Patent No. 3,088,386.

Turning attention first to the photocopy paper, this is, as shown in FIG. 2, loaded into the machine in the form of a roll 60, mounted upon a mandrel 61 feeding a web 62 downwardly. The means for loading, mounting and feeding of the web will be discussed in detail at a later point. It will suffice, for the present, to state that the web is pulled over roller 64, and guide 65 by a first pair of power driven feed rollers 66, 67, past a knife mechanism 69, having a stationary knife 70 and a movable knife 71 which is operated by electrical control and in accordance with a control circuit to be described. With the knife in open position, the web is fed through a pair of guides 73, 74, past a second pair of drive rollers 75, 76, to a third pair of drive rollers 77, 78, such that a length of eight and one half inches is fed between the second and third sets of rollers. In single copy operation, the knife mechanism 69 is operated so that the web is severed, becoming a copy sheet 80 which is moved upwardly in the machine by the third pair of drive rollers 77, 78 which are driven by belt means connected to the second drive rollers. The web is then fed through a charging unit 81, having electrodes 82, which are charged to a high voltage on the order of 10,000 volts D.C. The electrical power supply which furnishes the voltage to the electrodes is conventional and need not be discussed in detail.

Referring to FIG. 3, the sheet immediately upon leaving the charging unit 81 is moved by drive rollers 90, 91 into an exposing station 93, where the sheet is engaged by a vacuum transporting arrangement. In the present instance the vacuum transport includes a plurality of spaced belts, for example, as indicated at 95 trained about a lower roller 96 and an upper roller 97, both of which are suitably driven from the same mechanism which drives rollers 90, 91, previously referred to.

Referring to FIGS. 3, 5 and 6 conjointly, for the purpose of causing the copy sheet to adhere to the belts in the exposing station, a vacuum chamber 130 is provided in which a light vacuum is drawn through a vacuum inlet 131. The face of the vacuum chamber 130, which engages the belts 95 is open so that air is drawn between the belts establishing a vacuum at the belt surface 132. The severed and charged copy sheet 80 is transported to the center of the exposing station, at which time the drive is terminated but the vacuum is maintained. While the sheet is thus held stationary the light image of the original is cast upon it for an appropriate exposure time.

Following exposure (as viewed in FIG. 3) the drive is again put in motion and the sheet is moved by the belts 95 upwardly between rollers 136, 137 and into a developing unit 140 charged with toner powder. The toner powder is conveniently carried on grossly larger particles of iron to which the particles cling and from which the particles are transferred, by triboelectric effect, onto the charged areas on the sheet.

For an understanding of a construction of a developing unit 140, reference is made to Sugarman application Ser. No. 211,779, filed July 23, 1962 now U.S. Patent No. 3,196,831 issued July 27, 1965. It will suffice for the present to say that the developing unit includes a trough 142, having an entry slot on its bottom surface normally closed by a flap 143, which is, however, sufficiently light so that it may be readily pushed aside by the leading edge of the copy sheet. Mounted for rotation within the developing unit is a developing cylinder 144 having a screw threaded or knurled surface and in which magnetism is induced by means of a bar magnet 145, with the iron particles and the attached toner cohering on the surface of the cylinder to form a soft brush-like structure which is, as the cylinder 144 rotates, swept across the face of the sheet.

For the purpose of maintaining a uniform level of the iron-toner mix, as well as a uniform composition thereof, augers 147, extending lengthwise in the developing unit adjacent the developing cylinder, are constantly rotated.

Upon leaving the developing unit 140, the sheet is engaged and upwardly transported so that it enters a fixer unit 149, having a source of radiant heat which fuses the toner powder in place on the sheet and immediately thereafter pressure is applied thereto by a pair of finishing rollers 151, 152. Mounted between the rollers 151, 152 and the fixer unit is a blower 154, having an adjustable baffle 155 for cooling and blowing the sheet against a guide 156.

Briefly stated, the operation of the fixer unit 149 is such that radiant heat generated by fixer lamps I1 and reflector 158, in the present instance, plays upon the face of the sheet although it will be understood that the heat may, if desired, be applied to the back of the sheet or, indeed, to the back and face simultaneously. The temperature is sufficiently high so that the pigmented toner is fused and, in addition, the resin coating on the face of the sheet is slightly softened. Since very high temperatures are reached in the fixer unit, fibre glass strings (not shown) are provided to maintain the sheet a slight distance away from the reflector, thereby avoiding contact by the sheet with the reflector 158. In the present instance, it will suffice to say that upon leaving the fixer unit, both the toner and the coating are in a "hot" and soft state. As the sheet moves past the blower 154, the air blast therefrom cools the soft toner to keep it from being too soft at entry into the finishing rollers 151, 152. The finishing rollers are hard surfaced and biased together with a sufficient force so that the fused toner tends to be pressed into, and integrated with, the resin coating.

For the purpose of carrying away excess heat, there are preferably provided, both at the left and right-hand sides of the reflector a conduit through which cooling air is longitudinally forced.

After leaving the finishing rollers, the sheet is fed between a pair of exit rollers 160, 161, causing the same to curl face up into the receiving tray 48. It will be understood, however, that the copies need not be discharged in the direction of the tray but may be discharged, face down, in the opposite direction simply by mounting a deflector or the like on the rollers, in which case a suitable tray, extending inboard of the machine, may be provided for receiving the copies.

With the path of the copy sheet in mind from roll to point of discharge, attention may next be given to the motor and drive connections. In carrying out the invention two separate lower drives are used, an entrance drive and a window drive. Thus, as shown in FIGS. 4 and 9 conjointly, a motor B1 which includes a step down gearing arrangement 170 provides two output shafts 172, 173 for the entrance drive and window drive, respectively, from the motor B1. The shafts 172, 173 are coupled to a pair of single revolution clutches 176, 177 (FIG. 9), respectively. The purpose of the clutches 176, 177 will become apparent as the discussion proceeds, and it will suffice to say that they control the metering of the web for cut and exposure.

Turning first to the entrance drive, the output shaft 178 of clutch 176 through a set of gears 178a, 178b drives a belt pulley 179, which engages a belt 180. The belt 180, which is preferably of the "cog belt" variety, serves to drive a pulley 182 which is connected to the shaft 183 of roller 78, via a disengageable coupling 184. The companion roller 77 is driven from the roller 78 through spur gears 190, 191.

For the purpose of driving rollers 75, 76, the drive roll 78 carries a belt pulley 193 which, through belt 194, drives roller 76 via belt pulley 195. The companion roller 75 is driven through spur gears 197 on the opposite side of rolls 75, 76. In order to drive rollers 66, 67 in unison with the preceding rollers 75, 76, a drive belt 198 is provided serving to couple a pulley 201 with a pulley 202 on the shafts of rollers 76, 67, respectively.

For the purpose of threading the web 62 of a paper supply roll into the guides 73, 74 when loading the machine, a manually operable knob 203 is provided on the outwardly extending shaft of roller 76.

Turning attention next to the window drive mechanism (FIGS. 4 and 9 conjointly), the output of single revolution clutch 177 is stepped up through gears 205, 206, 207 which drive belt 208 via belt pulley 209. The belt 208 drives a belt pulley 210 connected to one end of shaft 211 of roller 90. The companion roller 91 is driven by a pair of spur gears 212, 213 at the opposite ends of the rollers.

For the purpose of driving the vacuum belt transport 93, a belt pulley 215, mounted on driven shaft 211, drives roller 216 via belts 218, 219 carried by concentric belt pulleys 220. Roller 216 driven by belt pulley 221 drives the upper belt roller 97 via a pair of spur gears 223, 224.

Turning attention next to the upper driving means, as viewed in FIG. 8, a driving motor B5 is provided which is operatively coupled to the fixer blower 230. The output shaft 231 of motor B5 having a sprocket 232, engaging a chain 233, driving a sprocket 234 is connected to one end of the developing cylinder 144. The augers 147 associated with the developing cylinder are rotated by a set of spur gears indicated at 235.

For the purpose of driving rollers 136, 137 at the exit of the transport belt assembly, a gear 234 at the driving end of the developing cylinder drives a gear 236 which, in turn, rotates roller 137; the companion roller 136 being driven by a set of spur gears 237, 238.

To drive the finishing rollers 151, 152, the gear 234 on the end of the developing cylinder 144 drives a belt pulley 239, which is engaged by a belt 240, via a direction reversing gear 241. The belt 240 is coupled to a second pulley 242, which is connected to the finishing roller 152. A set of spur gears 243 at the opposite end of roller 152 insures that the companion roller 151 is driven at identical speed. In order to drive the exit rollers 160, 161 a pair of belt pulleys 244, 245, engaged by a belt 246, are driven by the finishing roller 152.

For the purpose of periodically operating a replenisher 250 for the developer, the developing cylinder operates a toner dispensing device (not shown) via an electric clutch 251.

*Optical projection system*

For the purpose of projecting the image of the original material to be copied upon the copy sheet as the latter is held stationary in the exposing station, a novel optical system is provided which includes a projection lens and angled mirror with means to move them independently but in a coordinated fashion to achieve a range of magnification, specifically a range of reduction, as may be desired by the user, while constantly maintaining the image in sharp focus on the copy sheet. More specifically, in accordance with the invention, the optical system is such as to establish a reference edge at the window 35 on which the original is placed which serves not only to produce centering of the image on the copy sheet at a 1:1 copying ratio, but which serves to produce automatic centering of larger sized originals as a result of shift of the optical axis upon changing the magnification. Prior to discussing the manner in which these conditions have been met in the present system and the various associated features which contribute to the accuracy and convenience of operation, reference will be made to the primary structure which is set forth particularly in FIGS. 11 and 19. Thus, there is provided, in alinement with the sheet 80 in the exposing station 93, a projection lens 260 mounted on a carriage 261 slidable on longitudinally extending way bars 163, 164, the latter being secured at their ends in any suitable fashion to the frame of the machine. In the present instance the lens carriage 261 is maintained securely captive with respect to the bar 263 by fitting it with slidable bushings 265, 266 and telescoped over the bar. For shielding the copy sheet against the direct action of ambient light while accommodating movement of the lens carriage, a suitable bellows 268 is employed.

For the purpose of reflecting the image at 90° before it passes into the lens 260, a mirror 272 angled at 45°, is provided, mounted upon a carriage 273. Thus, the angled mirror defines an optical axis having vertical and horizontal legs between the window 35 and the exposing station 93, respectively. The carriage, which is of rigid cast construction, is mounted for longitudinal movement along the way bars in a manner similar to the lens carriage. Thus, the mirror carriage is held captive on the way bar 263 by bushings 275, 276 while the opposite side of the mirror carriage is supported on a roller 277, riding along the top of the way bar 264. The lens carriage is similarly carried by the way bars as can be seen in FIGS. 22 and 21.

For the purpose of moving the lens and mirror coordinated with one another to maintain focus while changing the degree of magnification, a novel form of four-bar linkage 300 is employed which may be understood upon reference to FIG. 19. In the present instance the linkage includes a disc 301 which is arranged in a recessed position below the way bars and which is pivoted to the frame of the machine at a center 302. Secured to the top of the disc 301 for rotation with it is an arm 303 having an outer pivot 304. Pinned to this outer pivot is a link 305 having an outer pivot 306. Pinned to the pivot 306 is a lever 310 which is anchored to the frame of the machine at a pivot 311. For the purpose of coupling the mirror carriage 273 to the end of the lever 310 to effect longitudinal movement of the carriage while permitting lateral accommodation, a pin and slot connection is employed which includes a pin 312 extending downwardly from the underside of the carriage snugly received in an arcuate slot 313 formed in the lever.

To produce the coordinated movement of the lens, a cable 320 is provided which is trained about the periphery of the disc 301 as well as about an idler pulley 321 to provide a run of cable which is parallel to the way bar 263. Means are provided for connecting the straight run portion of the cable to the lens carrier. Thus, as shown in FIG. 22, there is secured to the underside of the lens carriage 261 a cable connection in the form of a bracket having an adjustable portion 323 and a fixed portion 324. The portion 324 is of U-shape providing ears 326, formed with slots 327 in which the ends 328 of the cable are held captive. For the purpose of enabling adjustment of the lens carriage with respect to the cable, the base 261 of the connection carries a pinion 330 having a screwdriver slot 331 for adjustment and with the pinion engaging a rack 333 formed on the bracket 323. It will, therefore, be apparent that when the pinion is adjustably turned, relative movement occurs at the rack thereby moving the lens housing backwardly or forwardly a small amount with respect to the adjusting cable.

For the purpose of adjusting the mechanism as a whole, means are provided for rotating the disc 301 to which the links and cables are connected. Thus, referring to FIG. 19, there is provided, connected to the magnification control switch 43 previously referred to, a reversible two phase magnification drive motor B4, having a sprocket 340 on its output shaft engaging a chain 341 trained about a driven sprocket 342. Coupled concentrically to the sprocket 342 is a disc pinion 344 which engages gear teeth 346 formed on the periphery of the disc 301. It will be apparent, then, that upon operating the magnification control switch to the left or right, the disc 301 will be rotated, simultaneously moving the lens carriage 261 and the mirror carriage 312 by differing amounts and in the opposite directions.

The linkage which has been described is capable of moving the lens from its unity magnification position a distance equal to $f(1-d/D)$, while the mirror is moved oppositely a distance of $$f\frac{(1-d/D)^2}{d/D}$$

where $d$ and $D$ are corresponding dimensions on the copy and original, respectively, and $f$ is the focal length of the lens. Stated in other words, the ratio $d/D$ is the reduction ratio obtained. As the lens is moved toward the image plane to decrease the magnification ratio from the 1/1 value, the mirror must be moved in the opposite direction to keep the image in focus on the copy paper. The original to be copied is placed against the fixed reference edge of the window, and since the optical axis moves together with the mirror, the increase in halfwidth of the area on the original that can be copied is equal to the travel of the mirror and can be represented by the following equation:

(1) $$\frac{D-d}{2}=f\frac{(1-d/D)^2}{d/D}$$

where D is the width of the widest original to be copied and $d$ the width of the copy sheet. At unity magnification $d$ is also the width of the narrowest original format to be copied, the width of a standard 8½" letterhead being taken as a reference. It should be understood that the width of the original referred to is that portion of the original sheet to be copied, which is placed between the fixed reference edge and the framing pointers which are to be discussed below.

Thus, the maximum value of $f$ that will image a range of originals varying from the dimension $d$ to D on a copy sheet $d''$ wide may be given by solving Equation 1 above, for the value $f$, which is given by the following equation:

(2) $$f=\frac{d(D-d)}{2D(1-d/D)^2}$$

Equation 2 may be reduced to the following equation:

(3) $$f=\frac{dD}{2(D-d)}$$

In accordance with one of the features of the present invention, the focal length of the lens is fixed at the value determined by Equation 3 for a range of originals from $d$ to D inches in width, or at a slightly lower value. The desirable result which is achieved by this relationship is that alll sizes of originals within the range which may be accommodated by the machine may be positioned with respect to the same reference edge, with automatic centering of the image on the copy sheet and with complete imaging of the original within the copy sheet format. The procedure employed for selecting the reduction ratio of the system may be outlined for a practical case as follows: The amount of mirror movement required to maintain focus with varying magnification is set forth above. Where it is desired to accommodate originals of the standard letterhead width of 8½" up to, say, a width of 13½", it will be seen that maintaining a reference edge requires a shift of optical center, i.e., a shift in the half-width of the original, in the amount 2½". It will also be seen that where a 13½" original is to be reduced to a copy having a standard 8½" width, this corresponds to a magnification, i.e., reduction, 0.63. The maximum focal length for a range of 8½" to 13½" originals to be copied on a fixed copy size of 8½" is determined by setting $$f\frac{(1-d/D)^2}{d/D}$$

equal to 2½ and solving for $f$, which yields a value of 11.5". This value is what might be termed a theoretically desirable value $f$ to be employed in accordance with our teachings.

Thus, in practicing the invention we use a focal length which is about 10% less than the maximal value, namely a focal length of 10". While this change of focal length is not great, nevertheless, it is found that it produces a substantial increase in the compactness of the machine. In making a compensatory change in the magnification, a sheet is positioned at the reference indicated at RE in FIGS. 11 and 12, the lens and mirror carriages are so positioned, with the magnification control switch setting at unity, as to produce 1:1 magnification with the image in sharp focus on the copy sheet. A framing mechanism is then moved backwardly or forwardly a small amount so as to produce precise centering for the copy sheet. It is found that when the control switch is subsequently operated to produce other values of magnification, corresponding to larger originals, automatic sharp focusing occurs on the copy sheet but with the image of the original not quite filling the copy sheet field. In a practical case this "marginal space" may be a maximum of about 0.55" on the copy margin. It is found further that the marginal space tends to be maximum about half way through the magnification range with the image increasing to more nearly fill the field on the copy sheet as the magnification (reduction) is increased in magnitude to the end of the range.

Departing from the maximal value of focal length, as taught above, in addition to improving the compactness of the machine, provides a tolerance for the positioning of the copy sheet when using originals of large size. Thus, the copy sheets 80 may be as much as a tenth of an inch or more off in position by reason of variation in the disengaging point of the single revolution clutch while still insuring that all of the image is recorded. In the case of copying a standard letterhead of 8½" width, with a magnification ratio of precisely 1:1 this margin for positioning error, it is true, is not available. But letterheads almost invariably have a wide margin so that absolute precision in positioning is not necessary. It will be seen then that the procedure as outlined above satisfies a number of different and even conflicting requirements depending upon the size of original which is to be copied.

In the above discussion of optics, illumination of the original has been assumed. In a practical case we prefer to use illuminating troughs under the window at opposite sides thereof and a pair of longitudinal light sources which are spaced from one another end to end thereby to provide "equal" distribution of light across the image area. Thus, referring to FIG. 11, the "left" side of the original is illuminated by an assembly 350 having high intensity light sources 351 (I2) of pencil shape. These light sources are arranged in a trough 353 having an upwardly extending reflector 354. At the "right" hand side of the original window 35 there is an identical illumination unit 350a having high intensity sources 351a (I2) with a trough and reflector 353a, 354a. By reason of the cooperation of the two illuminating units light is evenly cast on the original with minimum scatter to the lower portion of the machine. The means for turning the illumination on and off will be discussed in connection with control circuit.

In accordance with one of the important features of the present invention, a movable framing arrangement is provided for "framing" the original as it is positioned along the window, with the framing arrangement being coupled to the magnification adjusting linkage so that when the original is "framed," the machine is automatically set to produce an image of the original on the copy sheet which is properly centered and focused and which occupies substantially the entire copy sheet field. In the present instance, referring to FIGS. 13 and 16 conjointly, the framing mechanism, indicated generally at 360, includes members or pointers 361 which are adjustable from left to right under the original window 35. For the purpose of mounting the members 361, each is secured to a belt 362a, 362b, respectively, which is trained about respective pulleys 363a, 363b, and 364a, 364b. As seen in FIG. 17, the pointer 361 is secured to the belt 362a via a channeled clamping block 365 and threaded fastener 366. For the purpose of moving the belts and the pointers 361 mounted thereon, the latter are coupled in a novel way to the linkage which adjusts the optical system. Thus, as shown in FIG. 16, the lever 310 is extended beyond the pivot 311 to provide a cable walker 370 having an arcuate surface 371 which engages a cable 372 trained about pulleys 373, 374 and 375. Secured to the ends of the cable 372 is a short length of link chain 376 which is trained about a chain wheel 377, driving both of the pointer operating pulleys 363a, 363b, via a belt 380 and pulleys 381, 382, 383.

In accordance with a further and closely related feature of the present invention auxiliary framing members or fingers 390, 391 are provided for framing the edges of the original which are at right angles to the main framing members 361 and having a movement which is coordinated with such members. In the present instance, the fingers 390, 391 are in the form of L-shaped members which are slidably received in a slot disposed in the frame along the reference edge of the window 35 of the machine. Thus, referring to FIGS. 13 and 18 and taking the finger member 391 by way of example, it will be noted that it has a tip portion which is visible beneath the window 35, the opposite side of the finger is slidably fixed in a slot formed in the machine frame by a guide 396, retainer plate 397 and bolts 398. The guides 396 on fingers 390, 391 are secured to a cable belt 400 strung about pulleys 401–405, inclusive, the latter of which is associated with pulley 364b which operates the window framing pointer 361.

Referring to FIG. 13, it may be noted that the framing members 361 move toward and away from the reference edge and they can be set at any distance W from the reference edge between 8½" and the length of the window 35. The frontal framing fingers 390, 391 are so constructed that when the framing members 361 are set for the 8½" dimension of a standard letterhead original, the fingers 390, 391 have a tip-to-tip separation of 11", indicated at L. Moreover, the tip-to-tip separation L of the fingers proportionately increase in response to retreating movement of the framing members.

It will be apparent from what has already been said that the framing mechanism, tied in as it is to the optical linkage, provides automatic means for adjusting the optical linkage as required to accommodate any size of original within the capability of the machine. Suppose, for example, that a standard letterhead original is to be copied. Under such circumstances, the magnification control switch 43 is simply moved in the proper direction until the framing pointer 361 and associated fingers 390, 391 frame the original by sighting along the document edges. The result is adjustment of the optical system to produce a focusing image at unity magnification. When an original of larger size but of the same proportion or form factor is placed in the machine, the magnification control switch is thrown to the right until the framing members and fingers again frame the original. This sets the optical linkage to produce a degree of magnification (reduction) such that the image of the original will substantially fill the field of the copy sheet. In making this adjustment the operator of the machine need not be concerned with the actual amount of magnification and need not make any size measurements whatsoever. The operator is simply instructed to set the framing members and the machine does the rest. Moreover, since the fingers 390, 391 are symmetrically arranged and moved in equal and opposite directions, the image will always be precisely centered on the copy sheet.

Suppose, however, that the original to be copied is larger than standard size and has dimensions which are not in the standard ratio. For example, let it be assumed that the original is square. Under such circumstances the operator of the machine is instructed to move the framing members 361 inwardly from its retracted position until either the framing members 361 or the fingers 390, 391 have been sighted along the edge of the original. This insures that the field on the copy sheet will be filled in one direction, thereby preserving all of the image of the original. While the copies may be somewhat less than filled in the opposite direction, it is insured that the image occupies the maximum space on the copy sheet consistent with recording all of the area of the original. Thus, with the present machine no portion of the copy is lost regardless of the size or shape of the original.

Control circuit

The preferred form of circuit for controlling operation of the photocopy machine described above is dividedly set forth in FIGS. 23a and 23b. The machine may be operated from a power supply line, such as a standard 115 volt AC line, fed via terminals 460, 461. Interlock switches S1, S2 and S3 are provided at the end panel, top cover and drawer openings, respectively, in the machine housing for disconnecting the electrical connection to the machine for normal servicing and inserting a fresh roll of copy paper. A main power-on switch 42 is provided which closes the circuit to the power relay K3, which locks in, thereby closing contacts 462, 463, and causing the drive motor B1, window vacuum motor B2, fixer blower motor 230 and low voltage power supply P1 to be energized. Energizing the low voltage power supply P1 causes a 24 volt DC voltage to be applied across lines 465, 466, thereby energizing a power indicator light I3 and a copy ready light I5 to indicate to the operator that the unit is in readiness for operation.

In carrying out the invention, when the machine is in the "ready" condition the copy operation is begun by pressing momentary copy switch 46. Copy switch 46 energizes a momentary copy start relay K6 which closes switches 467 and 468 which, in turn, energize the run-out locking relay K5 and the knife solenoid L1, thus severing the paper supply web to form a copy sheet 80. The copy switch 46 also serves to energize a replenisher timer T4 so that the replenisher is activated through energization of the replenisher clutch 251, and while depressed the copy switch breaks the circuit to the run-out timer T1, to be discussed below, in order to prevent inductive surges from false firing the run-out timer. Where the run-out locking relay K5 is locked in, as stated above, it arms the circuit to the run-out timer T1 and energizes the fixer relay K1. The fixer relay K1 closes switch contacts 469, 470 to turn on the fixer lamps I1, drive motor B5 and high voltage power supply P2 which energizes the corona unit 81 in readiness for the cut copy sheet which is now traveling through the machine.

In order to start the paper traveling through the machine and to meter out the next length of paper in preparation for a succeeding copy, the knife solenoid L1 which performs the paper cut opens the start switch S12 (FIG. 23b) at the beginning of its stroke and at the end of its stroke closes the start arming switch S13 which, in turn, energizes the arming relay K15. The arming relay K15 locks itself in and arms the circuit to the starting relay K18 by closing switch contacts 471, 472.

The knife solenoid L1 (FIG. 23a) which has a spring return closes the start switch S12 on its return stroke and energizes the starting relay K18. When the starting relay K18 is sealed in, it closes switch contact 474 to energize the entrance clutch solenoid L3 and a single revolution clutch 176 meters out the 8½" paper length for the ensuing cycle and feeds the previously cut sheet into the exposure window rolls. The starting relay K18 also closes contact 475 and energizes the window clutch solenoid L2 which operates the window drive clutch 177 through a single revolution to position the cut sheet in the exposure window by controlling the number of revolutions of the exposure window rolls and vacuum belts. The starting relay K18 closes switch contact 477, energizing the run-out lock out relay K4 which seals itself in, opening contact 479 and locks out the run-out timer T1. The run-out timer will be turned on at the completion of the copy cycle.

The window drive clutch controls a switch cam 480, as shown in FIG. 9, which is rotated through one complete revolution. The switch cam serves to operate certain switches in the circuit during set degrees of rotation of the cam. Thus, the manual copy switch lock-out S10 is open during cam rotation from 25° through 360° and during this period of rotation the copy ready light I5 is turned off, the arming relay K15 and the starting relay K18 are deenergized, thereby removing the power from the window clutch solenoid L2 and the entrance clutch solenoid L3. Lock-out switch S10 also opens the circuit to the run-out timer T1 to prevent false firing of the timer T1 through inductive surges and prevents restart of a new cycle before the present cycle is completed through exposure and exit of the copy.

The lock-out arming switch S8 is momentary at 225° of cam revolution and energizes the lock-out arming relay K13 at 225° of cam revolution closing switch contacts 480. The exposure arming switch S14 (FIG. 23a) is closed at 300° of cam rotation and energizes the exposure arming relay K9, which seals itself in, closes switch contact 481 and energizes the exposure time delay T2. At 360° rotation of the cam the window drive will have positioned the copy sheet in the exposure window and the sheet will be stopped in readiness for exposure.

Thus, at the end of the delay period the exposure timer T2 energizes the exposure time delay relay K8 which serves to seal in the exposure firing relay K10 by closing switch contacts 483 and 484. The exposure firing relay K10 maintains the copy ready light turned off during the exposure time and drops out the exposure arming relay K9, thereby shutting off the timer T2. The exposure firing relay K10 will simultaneously turn on the manually controlled exposure timer T3 and the exposure lamps I2. After the delay period permitting exposure, the exposure timer T3 energizes the exposure cut-off relay K11. The exposure cut-off relay K11 turns off exposure lamps I2 and drops out the exposure relay K2 and the exposure firing relay K10, thereby shutting off the exposure timer T3.

The exposure cut-off relay K11 energized the restart locking relay K19 which seals in switch contacts K19–1 and K19–2, thereby energizing the window drive clutch which rotates the switch cam through another complete revolution.

The lock-out contact K19–3 is closed at the end of exposure and seals in the lock-out relay K12 which prevents the exposure cycle from operating as the copy sheet is carried out of the exposure window. The lock-out relay K12 seals itself in and drops out the lock-out arming relay K13 in preparation for the next cycle. The lock-out cutoff switch S17 is opened when the cam is rotated to 350° of revolution thereby dropping out lock-out relay K12 in preparation for the next operating cycle.

The exposed copy sheet at this time is carried through by the upper drive where it passes through the developer unit for application of toner to the charged areas. Upon emergence from the developer unit the copy passes through the fixer unit where the fixer lamps I1 provide a source of radiant heat, and fix the toner to the exposed areas. The copy sheet after leaving the fixing unit is expelled from the machine.

At the end of the copy cycle the run-out timer T1 will provide approximately a thirty-second delay period at the end of which it turns off the fixer lamps I1 and the drive motor B5 by energizing the run-out timer relay K7, which drops out the run-out locking relay K5. This will have completed a single copy operation and the circuit will be in readiness for the next copy period.

It is apparent that operation of the photocopy machine for a single copy only requires that the operator turn on the power switch 42 and upon lighting of the copy ready light I5, the copy switch 46 is closed to start the copy operation.

In carrying out the invention, provision has been made for multiple copy operation wherein the paper feed and cut cycle of the copy paper to the window remains essentially the same as in single copy operation. Thus, for multiple copy operation preset counterdial switches 45 are provided on the control panel as discussed above. When the desired number of copies have been set on the selector dial, closing the counterswitch S15, for example, serves to seal in the continuous lock-out relay K16. When the copy start switch 46 is pressed, the copy start relay K6 is energized and the copy cycle as described above begins. At the end of the exposure cycle in the multiple copy operation lock-out relay K12 is deactivated as the continuous relay K16 will keep relay K12 deenergized until the last cycle. Thus, as the exposed copy leaves the window, a next sheet will be cut and fed into the exposure area and so on until the number of copies selected on the preset counter have been made. The run-out timer T1 will be inoperative until the last cycle is completed.

The timers T1, T2 and T3 utilized in the present circuitry are solid state devices controlled by the charging ratio of the respective capacitors C1, C2 and C3, plus the switching action of transistors Q1, Q2 and Q3, respectively.

In order to operate the optical projection system which includes the projection lens and angled mirror as described above, magnification drive motor B4 has been provided with a manual magnification drive power switch 43 so that the drive motor may be run in either direction in order to change the degree of magnification as described herein. The motor B4 is provided with a slip clutch (not shown) which allows for slippage at the end of the framing member limits of travel.

*Roll feeding arrangement*

In the above discussion it was assumed that a roll of copy paper 60 was provided and fed by the entrance drive rollers. In accordance with one of the aspects of the invention, means are provided for mounting the roll 60 to permit easy replenishment when the roll is exhausted. Thus, we provide drawer 500 (FIG. 1) which is slidable on transverse slides 501, 502, only one side being shown in FIG. 2, for movement into and out of the console 30. The roll, as stated above, is supported on a mounting bracket which carries the roll supporting mandrel 61.

For the purpose of breaking the driving connection to the feed rollers when the drawer is opened, a coupling 184, FIGS. 4 and 10, is connected to the shaft of the roller 78. The coupling includes two complementary portions 184a, 184b, having interengaging projections 504; the coupling portion 184a being mounted on a shaft 505, which is slidably carried by a sleeve 506. A second sleeve 507, which receives the shaft 505 and sleeve 506, is secured to the frame 32 of the machine by a support 509 having bearings 510 therein. Drive pulley 182 is secured to a shoulder 512 on the sleeve 507 by a set screw 513.

In order to insure that the two portions of the coupling are properly engaged when the drawer is retracted, a spring 515 abuts the sleeve 507 and the coupling 184a and allows the coupling 184a to be moved outwardly by the mating coupling portion 184b in the event that they are not precisely alined for engagement with one another. The sleeve 506 is retained by a pin 516 at its outwardly extending end.

In a typical roll replacing cycle, the drawer is opened, thereby disengaging the coupling 184 as well as disconnecting the electrical connection to the knife mechanism. The mandrel 61 is removed permitting the core to be slid endwise from the mandrel. A fresh roll is then inserted on the mandrel and it is replaced on the supports. The leading edge of the web (FIG. 2) is fed into the guides 73, 74, which is accomplished by turning a manually operated knob 203 (FIG. 4) at the end of roller 76. When the edge of the web emerges at the top of guides 73, 74, indicated at 520 in FIG. 2, the edge may be manually trimmed simply by pulling the free end of the web against the edge 520 with a shearing motion.

*Book well*

In the above discussion the copying machine was described with regard to copying an original sheet. However, in accordance with one of the aspects of the present invention, means are provided for the copying of book pages of various size without flattening the open book or cracking the binding. Thus, we provide a book well 640 immediately adjacent to the reference edge of the window to accommodate the free overhanging portion of the book with the book only in a partially opened position.

Referring to FIGS. 11 and 12, the book well 640 is formed with back, front and bottom walls 640 a-c, respectively. The front wall 640b extends only part of the depth of the well and a sloping support surface 640d extends from wall 640b to the extreme edge of the reference edge RE on the window 35. The support surface 640d is provided with a slope angle sufficient to hold an open book in position on the window, as shown, even though the book is opened with the greater portion thereof extending into the well 640. When larger books are being copied the book binding will engage the back wall 640a, thereby providing additional aid in supporting the book in position.

We claim as our invention:

1. In an office photocopy machine the combination comprising a frame, means including a horizontal window supporting an original at the top of the frame, a source of illumination under said window, a vertically oriented exposing station having means for positioning a copy sheet, a 45° mirror defining an optical axis having vertical and horizontal legs between the window and the exposing station, a lens in said optical axis, means associated with said window defining a reference edge for placement of the original, framing means associated with said window, means for moving the mirror horizontally to shift the vertical leg of the optical axis with respect to the reference edge so that the optical axis coincides with the center of the original, and means associated with said framing means and said mirror moving means for simultaneously moving the lens along said axis for maintenance of focus at the copy sheet.

2. In an office copying machine the combination comprising a frame, means including a horizontal window for supporting an original at the top of the frame, a source of illumination under said window, framing means associated wtih said window and movable to frame the original, a vertically oriented exposing station with means for positioning a copy sheet therein, a 45° mirror defining an optical axis having vertical and horizontal legs between the window and exposing station, a lens interposed in the horizontal leg of the axis, said lens and said mirror being mounted for movement along the horizontal leg of the optical axis, and a mechanical means for coordinating movement of said lens and said mirror when framing the original for maintaining focus at said copy sheet for all positions of said mirror.

3. In an office photocopy machine the combination comprising a frame, means including a horizontal window for supporting an original at the top of the frame, a source of illumination under said window, a vertically oriented exposing station offset from the window and having means for positioning a copy sheet therein, a reference edge at the extreme edge of the window, framing means associated with said window for framing the original in said window, a 45° oriented mirror defining an optical axis having vertical and horizontal legs extending between the window and exposing station, a lens interposed between the mirror and the exposing station, a lens carriage, a mirror carriage, a guideway for guiding said carriages parallel to the horizontal leg of the optical axis, means including a control switch, a mechanical means interconnecting said switch means and said carriages for effecting shift of the vertical leg of the optical axis with respect to the reference edge while maintaining focus at the copy sheet when framing the original sheet.

4. In an office photocopy machine the combination comprising a frame, means including a horizontal window for supporting an original at the top of the frame, a source of illumination under said window, a vertically oriented exposing station offset from the window and having means for positioning a copy sheet, a 45° mirror and associated lens defining an optical axis having vertical and horizontal legs between the original and copy sheet, a framing member associated with the window and movable to frame the original, said mirror and lens being separately movable along the optical axis, and means for coupling the framing member to the lens and mirror.

5. In an office photocopy machine the combination comprising a frame, means including a horizontal window for supporting an original at the top of the frame, a source of illumination under said window for illuminating said original, a vertically oriented exposing station offset from the window and having means for positioning a copy sheet therein, a 45° mirror having a carriage, a lens having a carriage interposed between the mirror and the copy sheet, means associated with said window defining a reference edge for placement of the original on said window, an adjustable framing member opposite said reference edge, means including a control switch for said framing member for adjusting the same so that it frames the original, and a mechanical means connected to the control switch means for simultaneously (a) moving the carriage for shifting of the optical axis to the center of the original and (b) moving the lens carriage for maintaining focus of the image on the copy sheet.

6. In an office photocopy machine the combination comprising a frame, means including a horizontal window for supporting an original at the top of the frame, a source of illumination under said window for illuminating said original, a vertically oriented exposing station offset from the window and having means for positioning a copy sheet, a 45° mirror interposed between the window and the copy sheet and having an associated lens defining an optical axis, said window having movable length and width framing members adjustably positioned thereon and connected together to maintain a ratio of length and width which corresponds to the copy sheet, and means for coupling together the framing members and said lens for adjusting the latter so that the image of a framed original substantially and entirely fills the copy sheet.

7. In an office photocopy machine the combination comprising a frame, means including a horizontal window for supporting an original at the top of the frame, a source of illumination under said window for illuminating the original, a vertically oriented exposing station offset from the window and having means for positioning a copy sheet therein, a 45° mirror and associated lens having carriages for respectively adjusting them along a horizontal axis, said window having a reference edge and a first framing member adjustably spaced therefrom, auxiliary framing members movable at 90° with respect to the first framing member, means interconnecting the framing members for maintaining a dimension ratio between them which is the same as the dimension ratio of the copy sheet, and means for coupling the framing members to the mirror and lens carriages for shifting the optical axis to the center of the framed original and for simultaneously adjusting the magnification ratio so that the dimension of the framed original coincides with the corresponding dimension of the copy sheet.

8. In an office photocopying machine the combination comprising a frame, means including a horizontal window for supporting an original at the top of the frame, a source of illumination under said window for illuminating the original, a vertically oriented exposed station offset from the window and having means for positioning a copy sheet therein, a 45° mirror and associated lens for projecting the image of the original onto the copy sheet, said window having a reference edge along one extreme edge thereof for positioning an original to be copied, means defining a book well immediately adjacent the reference edge for receiving the overhanging portion of a book containing the original to be copied.

9. In an office photocopy machine the combination comprising a frame, means including a horizontal window for supporting an original at the top of the frame, a source of illumination under said window for illuminating the original, an exposing station offset from the window having means for positioning a copy sheet therein, optical means for projecting the image of the original onto the copy sheet, said window having a reference edge along one extreme edge thereof, means defining a book well in said frame having a sloping support surface extending substantially to said extreme edge of the window for receiving and supporting the overhanging portion of a book having a page lying on said window and the inner edge of which coincides with said reference edge.

10. In an office photocopy machine the combination comprising a frame, means including a horizontal window supporting an original at the top of the frame, a source of illumination under said window, a vertically oriented exposing station having means for positioning a copy sheet, a 45° mirror defining an optical axis having vertical and horizontal legs between the window and the exposing station, a lens in said optical axis, means associated with said window defining a reference edge for placement of the original, means for moving the mirror horizontally to shift the vertical leg of the optical axis with respect to the reference edge so that the optical axis coincides with the center of the original, and means for simultaneously moving the lens along said axis for maintenance of focus at the copy sheet, means defining a book well in said frame having a sloping support surface associated with said reference edge for receiving and supporting the overhanging portion of a book having a page lying on said window and the inner edge of which coincides with said reference edge.

11. In an office photocopy machine the combination comprising a frame, means including a horizontal window for supporting an original at the top of the frame, a source of illumination under said window for supporting an original at the top of the frame, a source of illumination under said window for illuminating the window, a vertically oriented exposing station offset from the window and having means for positioning a copy sheet therein, a 45° mirror having an associated lens for projecting the image of the original onto the copy sheet, the mirror and lens both being horizontally movable for alining the optical axis with the center of the original and for maintaining focus of the original on the copy sheet, the focal length of the lens being equal to or slightly less than that given by the expression:

$$f = \frac{dD}{2(D-d)}$$

where $d$ is the width of the copy sheet and $D$ is the width of the maximum original to be copied as measured perpendicular to a reference line adjacent the edge of the window and where said optical axis is positioned to provide a centered copy of 1:1 magnification on said copy sheet.

12. In an office photocopy machine the combination comprising a frame, means including a horizontal window for supporting an original at the top of the frame, a source of illumination under said window for illuminating the window, a vertically oriented exposing station offset from the window and having means for positioning a copy sheet therein, a 45° mirror having an associated lens for projecting the image of the original onto the copy sheet, the mirror and lens both having horizontally movable carriages for alining the optical axis with the center of the original and for maintaining focus of the original on the copy sheet, the focal length of the lens being equal to or slightly less than that given by the expression:

$$f = \frac{dD}{2(D-d)}$$

where $d$ is the width of the copy sheet and $D$ is the maximum width of the original to be copied as measured perpendicular to a reference line adjacent the edge of the window and where said optical axis is positioned to provide a centered copy of 1:1 magnification on said copy sheet, and means interconnecting the mirror carriage and the lens carriage for moving the lens a distance equal to $$f(1-d/D)$$

and the mirror a distance of $$\frac{f(1-d/D)^2}{d/D}$$

13. In an office photocopy machine the combination comprising a frame, means including a horizontal window for supporting an original at the top of the frame, a source of illumination under said window for illuminating the original, a vertically oriented exposing station offset from the window and having means for positioning a copy sheet therein, a book well immediately adjacent one edge of the window, a 45° mirror and associated lens for projecting an image of said original onto said copy sheet with the field at the window defining a reference edge lying immediately adjacent the book well, and a flexible cover having a reflection under surface for covering said window, the cover having a beveled edge adjacent said window reference edge to permit insertion thereof between the pages of a book positioned on said window with the overhanging portion of the book being received in said well.

14. In an office photocopy machine the combination comprising a frame, means including a horizontal window for supporting an original at the top of the frame, a source of illumination under said window for illuminating the original, a vertically oriented exposing station offset from the window and having means for positioning a copy sheet therein, a 45° mirror having a mirror carriage, a lens associated therewith mounted on a lens carriage, a horizontal guideway for said carriages, a horizontally arranged pulley pivoted to said frame under said carriages, and an arm on said pulley, a link connecting the outer end of the arm to the mirror carriage, a cable trained about the pulley, means for connecting the cable to the lens carriage so that the lens carriage moves in the direction opposite to that of the mirror carriage, and means for rotating the pulley.

15. In an office photocopy machine the combination comprising a frame, means including a horizontal window for supporting an original at the top of the frame, a source of illumination under said window for illuminating the original, a vertically oriented exposing station offset from the window and having means for positioning a copy sheet therein, a 45° mirror having an associated lens between the mirror and the copy sheet for projecting the image of the original on the copy sheet, mirror and lens carriages respectively mounted for movement parallel to the horizontal optical axis, an adjusting arm pivoted in said frame for horizontal swinging movement, a connection between the arm and the lens carriage for moving the same directly in proportion to the angular swing of the arm, a link interconnecting the end of the arm and the mirror carriage, an adjustable framing member on said window for framing the original, means interposed between the framing member and the mirror carriage for causing the framing member to move coordinately with the mirror carriage, and means including a control switch coupled to said framing member for advancing the framing member coincidently with the edge of the original and for thereby simultaneously adjusting the mirror and lens carriages to an adjustment appropriate to the size of the original.

16. In an office photocopy machine the combination comprising a frame, means including a horizontal window, optical projection means for casting the image of the original onto said copy sheet, means defining a reference edge on said window having first adjustable framing members capable of broadwise movement with respect to said reference edge, means interconnecting the optical projection means and framing members for coordinated movement thereof, second framing members in the form of fingers disposed along said reference edge, and means providing a mechanical connection between said first framing members and said second framing members for defining a field on said window having the same dimensional ratio as the dimensional ratio of the copy sheet.

17. In an office photocopy machine the combination comprising a frame, means including a horizontal window for supporting an original at the top of the frame, a source of illumination under said window for illuminating the original, a vertically oriented exposing station offset from the window and having means for positioning a copy sheet therein, a 45° mirror and associated lens for casting the image of the original onto said copy sheet, a copy sheet supply means arranged below the exposing station including a carriage having means thereon for supporting a supply roll together with driven feed rollers and a knife mechanism for supplying severed copy sheets to said exposing station, means for driving said rollers, and detachable coupling means connected to said driving means to withdraw said carriage from the frame and completing a connection to the driving means when the carriage is restored to operating position.

18. In an office photocopy machine the combination comprising a frame and housing surrounding the same, means including a horizontal window at the top of the housing for supporting an original to be copied, a source of illumination under said window for illuminating the original, a vertically arranged exposing station below and to one side of the window, means for projecting the image of the original into said exposing station, a source of copy sheets, vacuum transport means including a vacuum chamber and a plurality of spaced driven belts associated with said vacuum chamber in said exposing station for transporting sheets from said source into said exposing station and for maintaining the transported sheet flat and stationary in said exposing station during the exposure, and means for developing the image cast onto the sheet in said exposing station.

19. In an office photocopy machine the combination comprising a frame and housing, means including a horizontal window at the top of the housing for supporting an original to be copied, a source of illumination under said window for illuminating the original, a vertically oriented exposing station below and to one side of the window, optical projection means for casting the image of the original into the exposing station, a supply roll below said exposing station, means including driven rollers and knife mechanism for feeding the sheets one by one to the exposing station, an electrostatic charging device interposed between the knife mechanism and exposing station for applying an all-over electrical charge to sheets fed to the exposing station, means including vacuum belts in said exposing station for transporting sheets into the station and for holding them stationary during exposure, means for developing and fixing the image, and control means for causing the driven rollers and vacuum belts to be driven in unison for a timed interval so that the copy sheet is accurately positioned in the exposing station.

20. In an office photocopy machine, the combination comprising a frame and housing surrounding the same, means including a horizontal window at the top of the housing for supporting an original, a source of illumination under said window for illuminating the original, a vertically oriented exposing station offset from the window and having means for positioning a copy sheet therein, optical projection means for casting the image of the original onto said copy sheet, a copy sheet supply means including a carriage occupying a normal position below the exposing station, said carriage having a supply roll, driven rollers and a knife mechanism, a drive control motor, means including a first single revolution clutch connected to said motor for driving said rollers so that in one revolution of said first clutch a cut copy is fed into the exposing station and a predetermined copy paper length is metered out past the knife mechanism, an electrostatic charging device interposed between the knife mechanism and exposing station for applying an all-over electric charge to sheets fed to the exposing station, means including a vacuum transport assembly in said exposing station, said vacuum transport assembly being driven through a second single revolution clutch connected to said drive motor for transporting sheets into the station and for holding them stationary during exposure in one revolution of said second clutch, and control means for causing said second single revolution clutch to rotate through a second revolution so that said vacuum transport assembly restarts for moving the exposed copy sheet out of the exposure station, and means for developing and fixing the image cast onto the sheet in the exposing station.

21. In an office photocopy machine, the combination comprising a frame and housing surrounding the same, means including a horizontal window at the top of the housing for supporting an original, a source of illumination under said window for illuminating the original, a vertically oriented exposing station offset from the window and having means for positioning a copy sheet therein, optical projection means for casting the image of the original onto said copy sheet, a copy sheet supply means occupying a normal position below the exposing station, said supply means including a paper supply roll, driven rollers and a knife mechanism, a drive control motor, means including a single revolution clutch connected to said motor for driving said rollers so that in one revolution of said clutch a cut copy is fed into the exposing station and a predetermined copy paper length is metered out past the knife mechanism, an electrostatic charging device interposed between the knife mechanism and the exposing station for applying an over-all electric charge to sheets fed to the exposing station, said exposing station positioning means including vacuum belts in said exposing station for transporting sheets from said charging device into said exposing station and for maintaining the transported sheet flat and stationary in said exposing station during the exposure, and means for developing and fixing the image cast onto the sheet in said exposing station.

References Cited

UNITED STATES PATENTS

| | | | |
|---|---|---|---|
| 1,793,837 | 2/1931 | Caps | 88—24 |
| 2,141,176 | 12/1938 | Draeger | 88—24 |
| 3,292,487 | 12/1966 | Jakobson | 88—24 |

NORTON ANSHER, *Primary Examiner.*

RICHARD A. WINTERCORN, *Assistant Examiner.*